(12) United States Patent
Tam et al.

(10) Patent No.: US 8,488,868 B2
(45) Date of Patent: *Jul. 16, 2013

(54) GENERATION OF A DEPTH MAP FROM A MONOSCOPIC COLOR IMAGE FOR RENDERING STEREOSCOPIC STILL AND VIDEO IMAGES

(75) Inventors: Wa James Tam, Orleans (CA); Carlos Vázquez, Gatineau (CA)

(73) Assignee: Her Majesty the Queen in Right of Canada, as represented by the Minister of Industry, through the Communications Research Centre Canada, Ottawa (CA)

( * ) Notice: Subject to any disclaimer, the term of this patent is extended or adjusted under 35 U.S.C. 154(b) by 1476 days.

This patent is subject to a terminal disclaimer.

(21) Appl. No.: 12/060,978

(22) Filed: Apr. 2, 2008

(65) Prior Publication Data

US 2008/0247670 A1    Oct. 9, 2008

Related U.S. Application Data

(60) Provisional application No. 60/907,475, filed on Apr. 3, 2007.

(51) Int. Cl.
*G06K 9/00* (2006.01)

(52) U.S. Cl.
USPC .............................. 382/154; 348/44; 345/419

(58) Field of Classification Search
None
See application file for complete search history.

(56) References Cited

U.S. PATENT DOCUMENTS

| 4,641,177 | A | | 2/1987 | Ganss ................................. 358/3 |
|---|---|---|---|---|
| 5,109,425 | A | * | 4/1992 | Lawton ......................... 382/107 |
| 5,886,701 | A | * | 3/1999 | Chauvin et al. ............... 345/418 |
| 6,215,516 | B1 | | 4/2001 | Ma et al. .......................... 348/43 |
| 6,314,211 | B1 | * | 11/2001 | Kim et al. ..................... 382/285 |
| 7,035,451 | B2 | | 4/2006 | Harman et al. ............... 382/154 |
| 7,054,478 | B2 | | 5/2006 | Harman ........................ 382/154 |
| 7,180,536 | B2 | | 2/2007 | Wolowelsky et al. .......... 348/42 |
| 7,319,798 | B2 | * | 1/2008 | Kim et al. ..................... 382/285 |
| 8,036,451 | B2 | * | 10/2011 | Redert et al. .................. 382/154 |
| 8,213,711 | B2 | * | 7/2012 | Tam et al. ..................... 382/162 |
| 2003/0218606 | A1 | * | 11/2003 | Zhirkov et al. ............... 345/419 |
| 2005/0053276 | A1 | | 3/2005 | Curti et al. .................... 382/154 |
| 2006/0056679 | A1 | | 3/2006 | Redert et al. .................. 382/154 |
| 2006/0232666 | A1 | | 10/2006 | Op de Beeck et al. .......... 348/51 |

(Continued)

OTHER PUBLICATIONS

L. MacMillan, "An image based approach to three dimensional computer graphics", Ph. D. dissertation, University of North Carolina, 1997.

(Continued)

*Primary Examiner* — Barry Drennan

(74) *Attorney, Agent, or Firm* — Teitelbaum & MacLean; Neil Teitelbaum; Doug MacLean

(57) ABSTRACT

The invention relates to a method and an apparatus for generating a depth map from a digital monoscopic color image. The method includes the following general steps: a) obtaining a first color component of the MCI, said first color component corresponding to partial color information of the MCI; and, b) assigning depth values to pixels of the MCI based on values of the first color component of respective pixels for forming the depth map for the MCI. In one embodiment, the depth values are generated by adjusting and/or scaling of pixel values of the Cr chroma component of the monoscopic source color image in the Y'CbCr color system.

19 Claims, 6 Drawing Sheets

U.S. PATENT DOCUMENTS

| | | | |
|---|---|---|---|
| 2007/0008342 A1* | 1/2007 | Sethuraman et al. | 345/635 |
| 2007/0024614 A1 | 2/2007 | Tam et al. | 345/419 |
| 2007/0146232 A1 | 6/2007 | Redert et al. | 345/6 |
| 2010/0182410 A1* | 7/2010 | Verburgh et al. | 348/51 |
| 2011/0193860 A1* | 8/2011 | Lee et al. | 345/419 |

OTHER PUBLICATIONS

K. T. Kim, M. Siegel, & J. Y. Son, "Synthesis of a high-resolution 3D stereoscopic image pair from a high-resolution monoscopic image and a low-resolution depth map," Proceedings of the SPIE: Stereoscopic Displays and Applications IX, vol. 3295A, pp. 76-86, San Jose, Calif., U.S.A., 1998.

J. Flack, P. Harman, & S. Fox, "Low bandwidth stereoscopic image encoding and transmission" Proceedings of the SPIE: Stereoscopic Displays and Virtual Reality Systems X, vol. 5006, pp. 206-214, Santa Clara, Calif., USA, Jan. 2003.

L. Zhang & W. J. Tam, "Stereoscopic image generation based on depth images for 3D TV," IEEE Transactions on Broadcasting, vol. 51, pp. 191-199, 2005.

W.J. Tam, "Human Factors and Content Creation for Three-Dimensional Displays", Proceedings of the 14$^{th}$ International Display Workshops (IDW'07), Dec. 2007, vol. 3, pp. 2255-2258.

Redert et al. "Philips 3D solutions: from content creation to visualization", Proceeding of the Third International Symposium on 3D Data Processing, Visualization, and Transmission (3DPVT'06), University of North Carolina, Chapel Hill, USA, Jun. 14-16, 2006.

"Dynamic Digital dDepth (DDD) and Real-time 2D to 3D conversion on the ARM processor", DDD Group plc., White paper, Nov. 2005.

* cited by examiner

GENERATION OF A DEPTH MAP FROM A MONOSCOPIC COLOR IMAGE FOR RENDERING STEREOSCOPIC STILL AND VIDEO IMAGES

CROSS-REFERENCE TO RELATED APPLICATIONS

The present invention claims priority from U.S. Provisional Patent Application No. 60/907,475 filed Apr. 3, 2007, entitled "Methods for Generating Synthetic Depth Maps from Colour Images for Stereoscopic and Multiview Imaging and Display", which is incorporated herein by reference.

TECHNICAL FIELD

The present invention generally relates to methods and systems for generating depth maps from monoscopic two-dimensional color images, and more particularly relates to utilizing color information containing in monoscopic images to generate depth maps for rendering stereoscopic still and video images.

BACKGROUND OF THE INVENTION

Stereoscopic or three-dimensional (3D) television (3D-TV) is expected to be a next step in the advancement of television. Stereoscopic images that are displayed on a 3D TV are expected to increase visual impact and heighten the sense of presence for viewers. 3D-TV displays may also provide multiple stereoscopic views, offering motion parallax as well as stereoscopic information.

A successful adoption of 3D-TV by the general public will depend not only on technological advances in stereoscopic and multi-view 3D displays, but also on the availability of a wide variety of program contents in 3D. One way to alleviate the likely lack of program material in the early stages of 3D-TV rollout is to find a way to convert two-dimensional (2D) still and video images into 3D images, which would also enable content providers to re-use their vast library of program material in 3D-TV.

In order to generate a 3D impression on a multi-view display device, images from different view points have to be presented. This requires multiple input views consisting of either camera-captured images or rendered images based on some 3D or depth information. This depth information can be either recorded, generated from multi-view camera systems or generated from conventional 2D video material. In a technique called depth image based rendering (DIBR), images with new camera viewpoints are generated using information from an original monoscopic source image and its corresponding depth map containing depth values for each pixel or groups of pixels of the monoscopic source image. These new images then can be used for 3D or multi-view imaging devices. The depth map can be viewed as a gray-scale image in which each pixel is assigned a depth value representing distance to the viewer, either relative or absolute. Alternatively, the depth value of a pixel may be understood as the distance of the point of the three-dimensional scene represented by the pixel from a reference plane that may for example coincide with the plane of the image during image capture or display. It is usually assumed that the higher the gray-value (lighter gray) associated with a pixel, the nearer is it situated to the viewer.

A depth map makes it possible to obtain from the starting image a second image that, together with the starting image, constitutes a stereoscopic pair providing a three-dimensional vision of the scene. Examples of the DIBR technique are disclosed, for example, in articles K. T. Kim, M. Siegel, & J. Y. Son, "Synthesis of a high-resolution 3D stereoscopic image pair from a high-resolution monoscopic image and a low-resolution depth map," Proceedings of the SPIE: Stereoscopic Displays and Applications IX, Vol. 3295A, pp. 76-86, San Jose, Calif., U.S.A., 1998; and J. Flack, P. Harman, & S. Fox, "Low bandwidth stereoscopic image encoding and transmission," Proceedings of the SPIE: Stereoscopic Displays and Virtual Reality Systems X, Vol. 5006, pp. 206-214, Santa Clara, Calif., USA, January 2003; L. Zhang & W. J. Tam, "Stereoscopic image generation based on depth images for 3D TV," IEEE Transactions on Broadcasting, Vol. 51, pp. 191-199, 2005.

Advantageously, based on information from the depth maps, DIBR permits the creation of a set of images as if they were captured with a camera from a range of viewpoints. This feature is particularly suited for multi-view stereoscopic displays where several views are required.

One problem with conventional DIBR is that accurate depth maps are expensive or cumbersome to acquire either directly or from a 2D image. For example, a "true" depth map can be generated using a commercial depth camera such as the ZCam™ available from 3DV Systems, Israel, that measures the distance to objects in a scene using an infra-red (IR) pulsed light source and an IR sensor sensing the reflected light from the surface of each object. Depth maps can also be obtained by projecting a structured light pattern onto the scene so that the depths of the various objects could be recovered by analyzing distortions of the light pattern. Disadvantageously, these methods require highly specialized hardware and/or cumbersome recording procedures, restrictive scene lighting and limited scene depth.

Although many algorithms exist in the art for generating a depth map from a 2D image, they are typically computationally complex and often require manual or semi-automatic processing. For example, a typical step in the 2D-to-3D conversion process may be to generate depth maps by examining selected key frames in a video sequence and to manually mark regions that are foreground, mid-ground, and background. A specially designed computer software may then be used to track the regions in consecutive frames to allocate the depth values according to the markings. This type of approach requires trained technicians, and the task can be quite laborious and time-consuming for a full-length movie. Examples of prior art methods of depth map generation which involve intensive human intervention are disclosed in U.S. Pat. Nos. 7,035,451 and 7,054,478 issued to Harman et al.

Another group of approaches to depth map generation relies on extracting depth from the level of sharpness, or blur, in different image areas. These approaches are based on realization that there is a relationship between the depth of an object, i.e., its distance from the camera, and the amount of blur of that object in the image, and that the depth information in a visual scene may be obtained by modeling the effect that a camera's focal parameters have on the image. Attempts have also been made to generate depth maps from blur without knowledge of camera parameters by assuming a general monotonic relationship between blur and distance. However, extracting depth from blur may be a difficult and/or unreliable task, as the blur found in images can also arise from other factors, such as lens aberration, atmospheric interference, fuzzy objects, and motion. In addition, a substantially same degree of blur arises for objects that are farther away and that are closer to the camera than the focal plane of the camera. Although methods to overcome some of these problems and to arrive at more accurate and precise depth values have been disclosed in the art, they typically require more than one exposure to obtain two or more images. A further disadvantage of this approach is that it does not provide a simple way to determine depth values for regions for which there is no edge or texture information and where therefore no blur can be detected.

A recent U.S. patent application 2007/0024614, which is assigned to the assignee of the current application, discloses the use of sparse depth maps for DIBR applications. These sparse depth maps, also referred to as so-called "surrogate" depth maps, can be obtained using edge analysis of the monoscopic image followed by asymmetrical smoothing, and contain depth information that is concentrated mainly at edges and object boundaries in the 2D images. Although these surrogate depth maps can have large regions with missing and/or incorrect depth values, the perceived depth of the rendered stereoscopic images using the surrogate depth maps has been judged to provide enhanced depth perception relative to the original monoscopic image when tested on groups of viewers. It was speculated that the visual system combines the depth information available at the boundary regions together with pictorial depth cues to fill in the missing areas. One drawback of this approach is that this technique can introduce geometric distortions in images with vertical lines or edges. The lack of depth information within object's boundaries might also negatively affect perceived depth quality rating.

Accordingly, there is a need for methods and systems for generating depth maps from monoscopic images that provide accurate object segregation, are capable of resolving depth information within objects boundaries, and are computationally simple requiring only small amount of processing.

An object of the present invention is to overcome at least some shortcomings of the prior art by providing relatively simple and computationally inexpensive method and apparatus for depth map generation from a 2D image using color information comprised in said 2D image.

Another object of the present invention is to provide relatively simple and computationally inexpensive method and apparatus for rendering stereoscopic and multi-view video and still images from 2D video and still images utilizing color information contained in said 2D images.

SUMMARY OF THE INVENTION

Accordingly, one aspect of the invention provides a method for generating a depth map from a monoscopic color image (MCI) composed of pixels. In one aspect of the invention, the method comprises the steps of: a) obtaining a first color component of the MCI, said first color component corresponding to partial color information of the MCI; and, b) assigning depth values to pixels of the MCI based on values of the first color component of respective pixels for forming the depth map for the MCI.

In accordance with an aspect of this invention, a method of generating a depth map from a monoscopic color image composed of pixels comprises the steps of: obtaining a Cr chroma component of the MCI; selectively adjusting pixel values of the Cr chroma component in a portion of the MCI that is selected based on color to obtain a color-adjusted chroma component; scaling values of the color-adjusted chroma component to obtain depth values for corresponding pixels to be used in the depth map; and, smoothing the depth map using a 2D spatial filter. The portion of the MCI in which pixel values of the Cr chroma component are adjusted may be selected based on pixel values of a second color component of the MCI, and may comprise one of: first pixels having R values of the MCI in the RGB color space satisfying a pre-determined red threshold criterion, and second pixels having G values of the MCI in the RGB color space satisfying a pre-determined green threshold criterion, with the step of selectively adjusting pixel values of the first chroma component comprising one of selectively reducing values of the first color component for the first pixels, and selectively enhancing values of the first color component for the second pixels.

Another aspect of the present invention relates to a method of generating a multi-view image comprising the step of: receiving a monoscopic color image composed of pixels; generating a depth map from the monoscopic color image based on a color component thereof, said color component corresponding to partial color information of the monoscopic color image; utilizing a depth image based rendering (DIBR) algorithm to create at least one deviated image by processing the monoscopic color image based on the depth map, so as to form a stereoscopic image pair.

Another feature of the present invention provides a 3D image generating apparatus comprising: a data receiver for receiving data representing a monoscopic color image; a depth map generator for generating a depth map comprising pixel depth values based on a first color component of the monoscopic color image; and, a DIBR processor for processing the monoscopic color image based on the depth map to render at least one deviated image for forming at least one stereoscopic image pair. In one aspect of the present invention, the depth map generator comprises: a color processor for obtaining the first and a second color component from the monoscopic color image; a scaling unit for scaling pixel values of the first color component of the monoscopic color image for producing the pixel depth values; a color adjuster operatively connected between the color processor and the scaling unit for selectively adjusting pixel values of the first color component based on pixel values of the second color component for respective pixels; and a spatial smoother for smoothing a spatial distribution of the pixel depth values in the depth map.

Another feature of the present invention provides an apparatus for generating 3D motion pictures from a sequence of monoscopic color images, comprising: an image receiver for receiving each monoscopic color image; a depth map generator for generating a depth map for each MCI based on a color component of the respective monoscopic color image, said color component provided by the image receiver; a DIBR processor for processing each monoscopic color image based on the corresponding depth map to render at least one deviated image to form at least one stereoscopic image pair for each of the monoscopic color images; and, a multi-view display for sequentially generating at least one stereoscopic view from each stereoscopic image pair.

BRIEF DESCRIPTION OF THE DRAWINGS

The invention will be described in greater detail with reference to the accompanying drawings which represent preferred embodiments thereof, wherein.

DETAILED DESCRIPTION

The invention will be described in connection with a number of exemplary embodiments. To facilitate an understanding of the invention, many aspects of the invention are described in terms of sequences of actions to be performed by functional elements of a video-processing system. It will be recognized that in each of the embodiments, the various actions including those depicted as blocks in flow-chart illustrations and block schemes could be performed by specialized circuits, for example discrete logic gates interconnected to perform a specialized function, by computer program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention may be embodied in many different forms, and all such forms are contemplated to be within the scope of the invention.

In the context of the present specification the terms "monoscopic color image" and "2D color image" are used interchangeably to mean a picture, typically digital and two-dimensional planar, containing an image of a scene complete with visual characteristics and information that are observed with one eye, such as luminance intensity, color, shape, texture, etc. Images described in this specification are assumed to be composed of picture elements called pixels and can be viewed as two-dimensional arrays or matrices of pixels, with the term "array" is understood herein to encompass matrices. A depth map is a two-dimensional array of pixels each assigned a depth value indicating the relative or absolute distance from a viewer or a reference plane to a part of an object in the scene that is depicted by the corresponding pixel or block of pixels. The term "color component", when used with reference to a color image, means a pixel array wherein each pixel is assigned a value representing a partial color content of the color image. A color component of a monoscopic color image can also be viewed as a gray-scale image. Examples of color components include any one or any combination of two of the RGB color components of the image, or a chrominance component of the image in a particular color space. The term "deviated image," with respect to a source image, means an image with a different viewpoint from the source image of a given scene. A deviated image and a source image may form a stereoscopic image pair; two deviated images with different viewpoints may also form a stereoscopic pair. The larger the difference in view point deviation the larger will be the perceived depth of objects in a resulting stereoscopic view.

Figure 1:
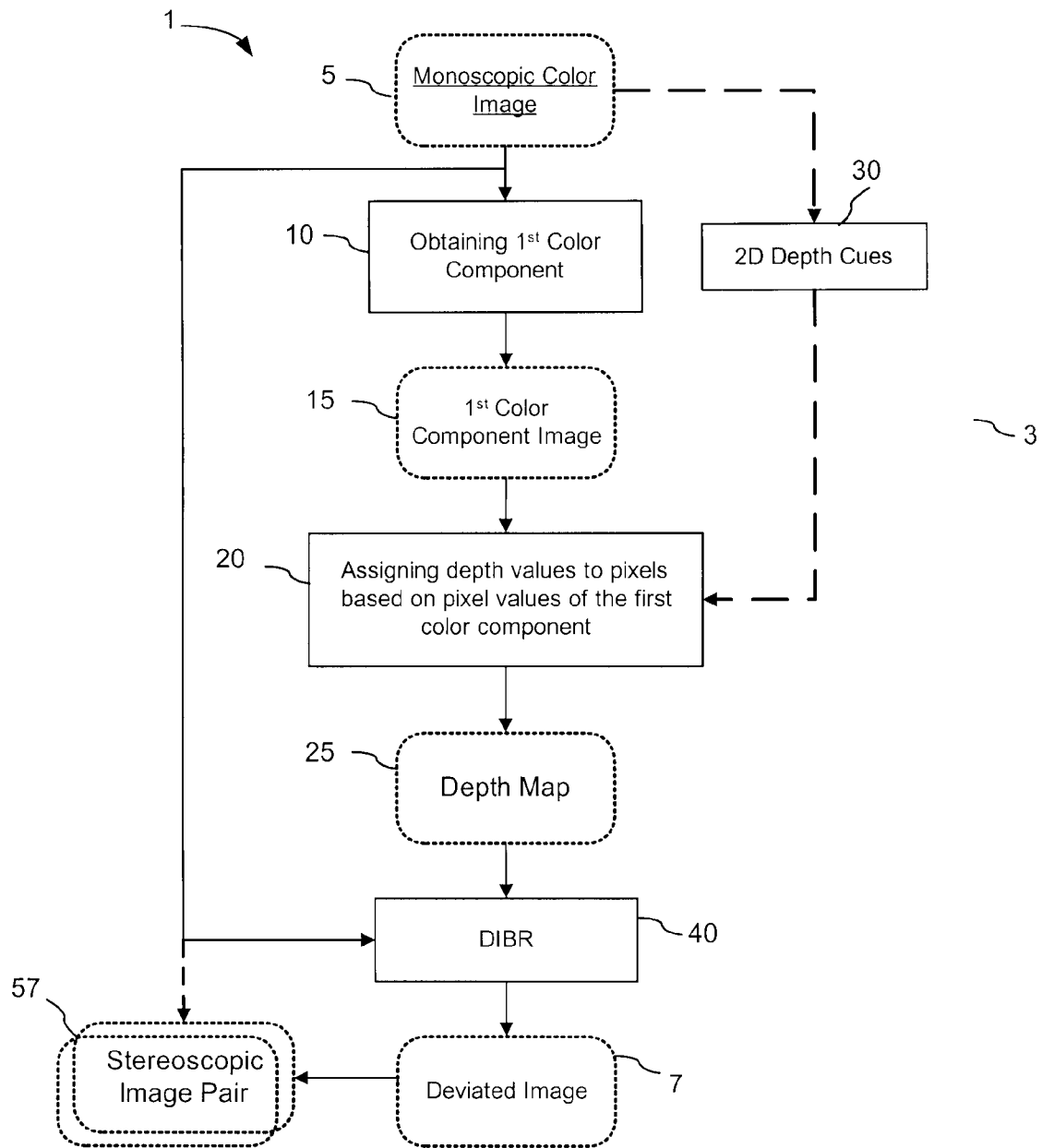
FIG. 1 is a flowchart of a method of generating multi-view images from a source 2D color image according to the present invention.
Figure 2:
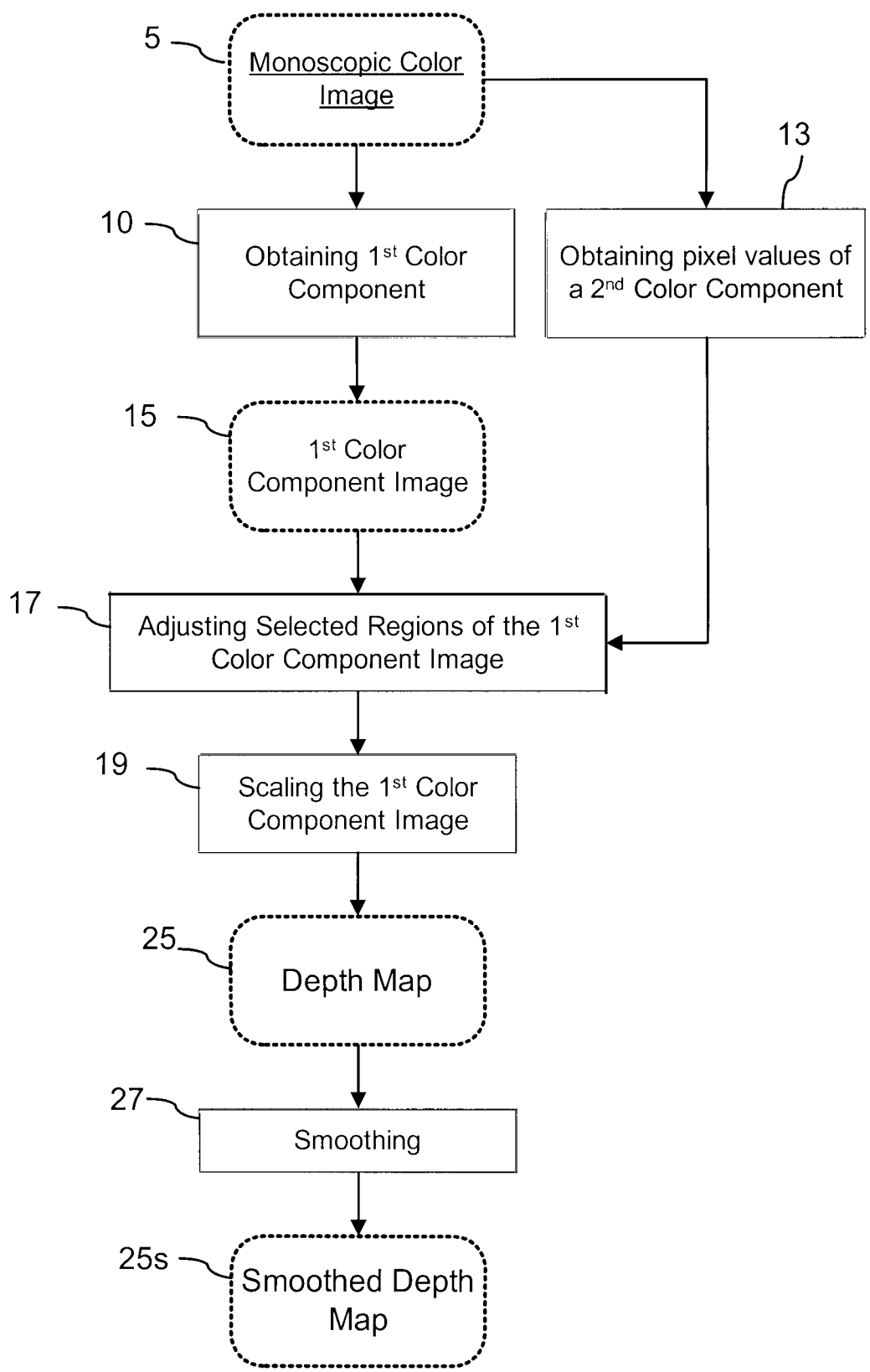
FIG. 2 is a flowchart of a method of generating a depth map based on a color component of a source 2D color image according to the present invention.

Flowcharts shown in FIGS. 1 and 2 illustrate exemplary embodiments of a method of the present invention for generation of a depth map from a monoscopic color image (MCI), which will now be described.

FIG. 1 generally illustrates a process 1 of the present invention wherein a stereoscopic image pair (SIP) 57 is generated from an MCI 5 using a depth map 25, which is obtained from the MCI 5 using a depth map generation method 3. The method 3, which according to the present invention can be used for generating depth maps from either still or video 2D color images, generally involves selecting, or in other way obtaining, a color component 15 of the MCI 5, which is hereinafter referred to as the first color component 15, and then using this color component, with optional modifications, as the depth map 25 to render the SIP 57. In its preferred embodiment, method 3 makes use of the fact that digital video signals carry color images in the form of a luminance (luma) component and two or more chrominance (chroma) components, and thus those chroma components are readily available from the received video signal.

Generally, a variety of color models may be used for representing colors of the MCI 5, such as RGB, HSV, L*a*b*, YUV, Y'CbCr, CYMK, etc. RGB (Red, Green, Blue) color space represents a color with a red component (R), a green component (G) and a blue component (B). In a three-dimensional coordinate system, each of the R, G, and B components of the RGB color space represents a value along an axis, the combination of the values defining a color space. For digital video signals in component format, the Y'CbCr color system is typically used; the Y'CbCr color space represents a color with a gamma-corrected luma component Y', and two chroma components, Cr and Cb. The chroma, or chrominance, components Cr and Cb are obtained by subtracting the luma component Y' from the red component R and the blue component B, respectively:

$Cb = B - Y'$ $Cr = R - Y'$

The R, G, and B may refer to the tristimulus values of red, green, and blue that are combined to create the color image on a display, which may be gamma-corrected. The color components may have other scale factors and offsets applied to them, which differ depending on the video signal scheme used. Furthermore, chroma subsampling may be used wherein the luminance component representing brightness is provided with a higher resolution than the chroma components. For example, in 4:2:2 chroma subsampling, the two chroma components are sampled at half the sample rate of luma, so horizontal chroma resolution is cut in half. Advantageously, this chroma sub-sampling reduces processing requirements of the method 3 of the present invention. Generally, the method 3 of the present invention may be applied to MCI 5 provided in data formats corresponding to a variety of color models, as any color format, i.e., color space or model, can be converted to another color format.

Turning again to FIG. 1, the first color component 15 of the MCI 5 is obtained in a first step 10. This step may involve, for example, receiving a digital video signal, identifying therein pixels corresponding to one image frame, wherein each pixel has three or more values associated therewith identifying pixel's color and brightness, and extracting pixel values $C1(n, m)$ of the first color component of the MCI 5, which may form a 2D array C1 of the pixel values $C1(n,m)$, where integers n and m are pixel row and column counters in a respective gray-scale image. Alternatively, this step may involve reading an image file from computer-readable memory to obtain the MCI 5, and performing video signal processing to extract therefrom the first color component 15 of the MCI 5. The depth map 25 is obtained in a step 20 from the first color component 15 of the MCI 5 by assigning depth values to pixels of the MCI 5 based on values of the first color component 15 for respective pixels. In some embodiments, this step may involve a simple spatially-uniform scaling, which may include uniform offsetting, of pixel values of the first color component 15, and using the resulting gray-scale image as the depth map 25, which we found may be adequate to provide an enhanced perception of depth in some cases. In other embodiments, this step may include selectively adjusting pixel values of the first color component 15 in selected regions thereof based on color or other depth cues, as described hereinbelow by way of example. The term "uniform scaling" as used herein means applying a same scaling rule to pixel values independently on locations of respective pixels in the image.

Once generated, the depth map 25 is used in a step 40 to form at least one deviated color image (DCI) 7 by means of depth image based rendering (DIBR) processing of the MCI 5, with the DCI 7 corresponding to a different camera viewpoint as compared to one used in recording the MCI 5. In some embodiments, the DCI 7 and the MCI 5 form the SIP 57 that is provided to a multi-view (3D) display. In some embodiments, more than one deviated images may be generated by the DIBR step 40 to form one or more stereoscopic image pairs with different viewpoints. A detailed description of a suitable DIBR algorithm can be found, for example, in an article entitled "Stereoscopic Image Generation Based on Depth Images for 3D TV", Liang Zhang; Tam, W. J., IEEE Transactions on Broadcasting, Volume 51, Issue 2, June 2005 Page(s): 191-199, which is incorporated herein by reference.

The method 3 of the present invention for depth map generation takes advantage of the ability of the human visual-cognitive system to mask any inaccuracies that might occur in the depth ordering of different components of the stereoscopic image. These inaccuracies may however be at least partially compensated by identifying regions of the first color component 15 wherein depth ordering errors are most likely to occur, and selectively adjusting pixel values of the first color component 15 in the respective regions of the MCI 5. Such identification may be preformed based on one of known monoscopic depth cues in step 30, and/or based on color.

Inaccurate depth ordering may occur, for example, for regions of the MCI 5 that are characterized by high-intensity saturated or nearly-saturated colors, resulting in the particularly brightly colored regions appearing too close or too far from the viewer in a 3D image obtained using the color-based depth map 25. Advantageously, these inaccuracies can be at least partially compensated by identifying the brightly-colored regions based on a color component or components other than the first color component and adjusting pixel values of the first color component 15 within these regions.

FIG. 2 illustrates one exemplary embodiment of the method 3 of the present invention in further detail. In this embodiment, the step 10 of obtaining the first color component of the MCI 5 may be accompanied by a step 13 wherein a second color component of the MCI 5 is obtained, for example as an array C2 of pixel values C2($n,m$).

Note also that each of the first color component 15, the second color component and the depth map 25 can be viewed as a gray-scale image composed of pixels; accordingly, we will be referring to pixel values of these images also as (pixel) intensity values, and we will be referring to regions of these maps composed of pixels having high/low pixel values as light/dark regions, respectively. In the depth map 25, brighter regions corresponds to objects or parts of objects that, after the DIBR, will generally appear closer to the viewer than objects corresponding to regions that are relatively darker.

Next, in a step 17 selected regions wherein pixel values of the first color component 15 are to be adjusted are identified on the basis of pixel values C2($n,m$) of the second color component, for example by checking if the pixel values C2($n, m$) satisfy one or more pre-determined threshold criteria, and within these regions pixel values of the first color component 15 are adjusted according to a pre-determined rule. Next, all pixel values of a resulting color-adjusted first color component are uniformly scaled in step 19 to obtain pixel depth values defined within a desired depth value range; these pixel depth values are then assigned to corresponding pixels of the MCI 5, with a resulting gray-scale image forming the depth map 25. In an optional step 27 this depth map 25 can be smoothed using a spatial low-pass filter such as a 2D Gaussian filter g(x, Φ) defined in each dimension by equation (1):

$$g(x, \sigma) = -\frac{1}{\sqrt{2\pi}\,\sigma} \exp\left\{-\frac{x^2}{\sigma^2}\right\}, \text{ for } -w \leq x \leq w, \quad (1)$$

where w is the filter's width (window size), which determines the range, or spatial extent, of depth smoothing at a local region, and σ is the standard deviation, which determines the strength of depth smoothing.

Such filtering results in a smoothed depth map 25s, which is then used in the DIBR process 40 to obtain the stereoscopic image pair (SIP) 57; suitable DIBR algorithms are known to those skilled in the art, with an exemplary DIBR algorithm described in U.S. Patent Application 2007/0024614, which is assigned to the assignee of the current application and is incorporated herein for all purposes.

Exemplary embodiments described hereinbelow utilize a Cr chroma component of the MCI 5 in the Y'CrCb color space as the first color component, although in alternative embodiments other color or chroma components based on other color models may be used instead as the basis for the depth map generation. One advantage of the Cr chroma component is that it can be obtained directly from the input digital video signal when a component data format is used. Alternatively, the Cr component can be obtained using known video processing routines from images saved in various image file formats such as BMP, JPEG, TIFF, GIF, etc, some of which may store color information defined in the Y'CbCr space, while others such as BMP files may store color information defined in the RGB space.

One possible implementation of the method 3 of the present invention that is based on the selection of the Cr chroma component of the MCI 5 as the first color component 15 is exemplified in an Appendix section hereinbelow by means of a MATLAB® function 'ExampleMakeComponent-DepthMap( )', and will now be described in further detail. Accordingly, in the context of this particular embodiment the first color component 15 of the MCI 5 will also be referred to as the Cr chroma component 15, or simply as the Cr component 15.

The selection of the Cr chroma component of the MCI 5 as the basis for the depth map 25 stems from our discovery that for image regions corresponding to specific objects such as human faces, the Cr intensity map is fairly close to a "true" depth map of the original 2D color image. That is, for the large part, areas within each object region such as human face that are supposed to be closer to the viewer are lighter in intensity than those areas in which they are farther behind. Indeed, we found that the direct use of the Cr chroma component 15 as the depth map 25 in the DIBR process produced rendered stereoscopic images 57 which in many cases provided comfortable viewing experience with convincing depiction of stereoscopic depth, especially after the range of Cr intensity values was expanded from a typically smaller range that was contained in the raw Cr component image.

The enhanced sensation of depth attained with this method can be explained by an observation that local changes in the Cr chrominance component intensity for any given object depicted in the 2D color image are in correspondence with the variations in actual relative depth of different portions of the object. That is, regions of the Cr chrominance component corresponding to ridges that are raised are lighter in intensity than valley regions, which are darker. This can be explained by noting that local depth in object regions and their constituent parts is captured in the source image in the form of shading information.

However, errors in depth ordering of depicted objects may occur as a result of high intensity, for example saturated, colors in the original source images and due to differences in light absorption of materials that depicted objects are made of. When the Cr component 15 is used as the basis for the depth map, regions that are bright red in the MCI 5 may appear very light in intensity, or bright, in corresponding regions of the depth map 25. In the DIBR process 40, this lightness may lead to these regions being rendered closer to the viewer than they should be. For example, clothing that are red in color might be rendered to bulge out inappropriately compared to regions with skin tones, such as the face and limbs.

We also observed that high intensity values of the green hue lead to low intensity values of the Cr chrominance component, i.e. look dark or black in the Cr component 15 when viewed as the grey-scale image. Thus, if the MCI 5 depicts green objects in the foreground, pixel values $C1(m,n)=Cr(m,n)$ of the Cr component 15 corresponding to these green foreground objects would be relatively small, i.e. closer to the lower bound of the corresponding pixel value range of the Cr component. If the Cr component 15 is then used as the depth map 25, i.e. each pixel of the MCI 5 is assigned a depth value equal to the value $Cr(m,n)$ of the Cr component 15 for the corresponding pixel, the foreground green objects depicted in MCI 5 would be incorrectly rendered by the DIBR process 40 as if they were located in the background.

However, we found that when these high-intensity green regions are observed in the rendered 3D images, they may not appear to be receded into the background, as the visual-cognitive system of a human observer has the capability to mask inconsistencies and integrate depth information from both stereoscopic and monoscopic pictorial depth cues to arrive at a coherent view of a visual scene. Still, in these regions the perceived extent of depth may be somewhat compromised, i.e., the foreground green objects may not appear to extend as far out in space as they should.

The perceived 3D quality of the rendered stereoscopic images may be further enhanced if regions of the MCI 5 consisting of high-intensity red and/or green hues are adjusted in intensity, so that possible detrimental effects of errors in object depth ordering due to the presence of intensely red objects in the background and/or intensely green objects in the foreground can be subdued, even without any prior knowledge of what is in the background or foreground.

Accordingly, in this exemplary implementation the second color component selected in the step 13 of the method of FIG. 2 may be one of the red (R) and green (G) RGB components of the MCI 5, or both. In the following description pixel values of the red component of the MCI 5 will be referred to as the red intensity values or R values of respective pixels, and pixel values of the green component of the MCI 5 will be referred to as the green intensity values or G values of respective pixels. The RGB components of the MCI 5 may be first determined by converting the MCI 5 into the RGB color space using known image processing functions, for example as specified in Appendix, line (92) of the MATLAB® code.

The step 17 of the method 3 in this embodiment of the invention may then include the following steps:

I) identifying first regions of the MCI 5 composed of pixels having R values satisfying a pre-determined red threshold criterion, II) selectively reducing pixel values of the Cr component in the first regions according to a first pre-determined rule, and III) identifying second regions of the MCI 5 composed of pixels having G values satisfying a pre-determined green threshold criterion, IV) selectively enhancing pixel values of the Cr component in the second regions according to a second pre-determined rule. The first and second regions will also be referred to herein as the red and green regions, respectively.

These steps are exemplified in the MATLAB® code given in the Appendix hereinbelow, lines (195)-(221). In this code, the MCI 5 is represented as an array 'yuv( )' in a YUV format, where Y stands for the luma component, and U and V stand for the Cb and Cr chroma components, respectively. The R, G, and B color components of the MCI 5 in the RGB color format are represented by means of a single 3D array 'rgb( )', with the red, green and blue components given by 2D arrays rgb(:,:,1), rgb(:,:,2), and rgb(:,:,3), respectively. Finally, the first color component, i.e. the Cr chroma component, is represented as a 2D array 'component( )'. The notations 'component(m,n)', 'rgb(m,n,1)', 'rgb(m,n,2)', and 'rgb(m,n,3)' refer to the Cr, R, G, and B values of a pixel (m,n) in the YUV and RGB representations of the MCI 5, respectively.

The pre-determined red threshold criterion may include determining for each pixel of the MCI 5 if at least one of the following threshold conditions holds: i) the R value exceeds a first red threshold value, RedThreshold(1), ii) the R value minus G value exceeds a second red threshold value, RedThreshold(2), and iii) the B (blue) value minus G value exceeds a third red threshold value, RedThreshold(3).

In the exemplary embodiment of the method described in the Appendix, see line (209) of the MATLAB® code in the Appendix, the identification of the red regions that are to be reduced in intensity are based on all three threshold conditions (i)-(iii), which have to be satisfied simultaneously for a particular pixel to be selected for adjustment. We found that utilizing the second red threshold condition (ii) is advantageous to ensure that bright white regions, consisting of high values of red, blue, and green, are not selected as red regions for Cr values adjustment. We also found that condition (iii) may be advantageous in determining which regions are selected as the red regions for the Cr values adjustment, due to the potential presence of skin tones in the MCI 5. These selection criteria, and particular values of the red thresholds RedThreshold(i), i=1,2,3 that are given on lines (60) and (71) of the MATLAB® code in the Appendix hereinbelow, are based on experimental observations using sets of frame sequences from commercial movies on DVD.

Once the red regions of the MCI 5 are selected, values of the Cr component 15 for the pixels in these regions, said pixels being also referred to hereinbelow as first pixels, are selectively reduced. In the exemplary embodiment of Appendix, the Cr pixel values in the red regions are reduce by a pre-determined fraction of a difference between the actual, or scaled, value of the Cr component of the MCI 5 for the respective pixel and a minimum value of the Cr component, see line (213) of the MATLAB® code in Appendix. The predetermined fraction may be determined experimentally, and is an input parameter of the MATLAB® function 'ExampleMakeComponentDepthMap( )' given in Appendix. By way of example, this predetermined fraction may be equal to 0.3 (See line (7) in MATLAB® Code of Appendix).

Similarly, the pre-determined green threshold criterion may include determining for each pixel of the MCI 5 if the G value exceeds a first green threshold value, GreenThreshold (1). In the exemplary embodiment of Appendix, see line (215) of the appended MATLAB® code, the identification of the green regions that have to be enhanced in intensity are based also on a condition that the R value of a pixel in the respective green region is less than a second green threshold GreenThreshold(2), with the green threshold values GreenThreshold(1) and GreenThreshold(2) being experimentally determined input parameters of the MATLAB® function 'ExampleMakeComponentDepthMap( )' given in Appendix. Pixels for which the green threshold criteria are satisfied are also referred to hereinbelow as second pixels.

Once the green regions of the MCI 5 are identified, values of the Cr component 15 for the pixels in these regions, i.e. the second pixels, are selectively enhanced. In the exemplary embodiment of Appendix, the Cr pixel values in the green regions are enhanced by a pre-determined fraction, such as 0.1, as exemplified on line (216) of the MATLAB® code in Appendix. In other embodiments, alternative algorithms may be used for adjusting pixel values of the Cr component 15 in selected regions, such as the red and/or green regions, which may include for example using look-up table or a conversion matrix.

Once pixel values of the Cr component 15 for pixels corresponding to the selected red and green regions are adjusted as described hereinabove, in step 19 the resulting color-adjusted Cr component may be uniformly scaled in intensity, so that its pixel values span a desired range for the pixel depth values. Note that the term "scaled" and "scaling" in the context of this specification includes offsetting, so that a constant depth value can be added or subtracted to each pixel value of the color-adjusted Cr component. This pixel value scaling may be advantageous if pixel values of the Cr component of the MCI 5 span a range that is too narrow and needs to be expanded to generate a larger range of depth values, for example from 0 to 255 if an 8 bit depth map is desired. The scaling parameters may also be used to define the depth volume in the scene, by specifying new values NewMaximum and NewMinimum for the farthest and the closest points. These scaling parameters can also be used to shift the range of depth values to help define a proportion of the scene in the image that will be perceived in front of the screen. For example, if a depth value of 125 is used by a 3D display as a rendered depth to be displayed at the screen distance from the viewer, all pixel with depth values in the depth map exceeding 125 will be perceived as being in front of the screen, and pixels with depth values less than 125 will be perceived as being behind the screen. By changing the values of NewMaximum and/or NewMinimum, the proportion of all pixels in the image that shall be perceived by the viewer as being in front of the screen may be changed.

This uniform scaling step 19 may either follow the selective color adjustment step 17 as shown in FIG. 2, or precede it as exemplified by the appended MATLAB® code, lines (180)-(192). In the exemplary MATLAB® implementation given in Appendix, the scaling is implemented using a standard linear operation according to the following equation (1):

$$NewCurrent = \left( \frac{Current - OldMinimum}{OldMaximum - OldMinimum} \times (NewMaximum - NewMinimum) \right) + NewMinimum \quad (1)$$

Here 'NewCurrent' and 'Current' denote a Cr value of a particular pixel after and before the scaling step, respectively, while parameters 'OldMaximum' and 'OldMinimum' are maximum and minimum pixel values of the Cr component 15 of the MCI 5, respectively, prior to the step of scaling. In other embodiments, more complex and non-linear operations can be utilized to transform the mapping of the range of Cr intensity values in the original color image to the depth in a scene that would optimize perceived naturalness for specific video sequences and/or applications.

Figure 3A:
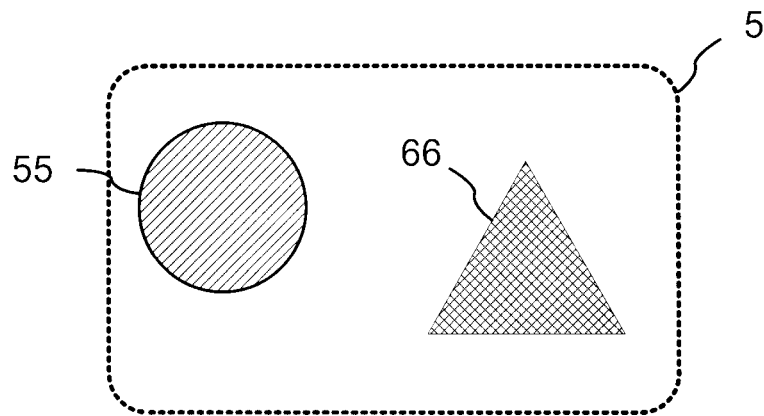
FIGS. 3A-3G is a set of schematic diagrams illustrating different stages of the color-based process of generating a depth map from a source 2D color image.
Figure 3B:
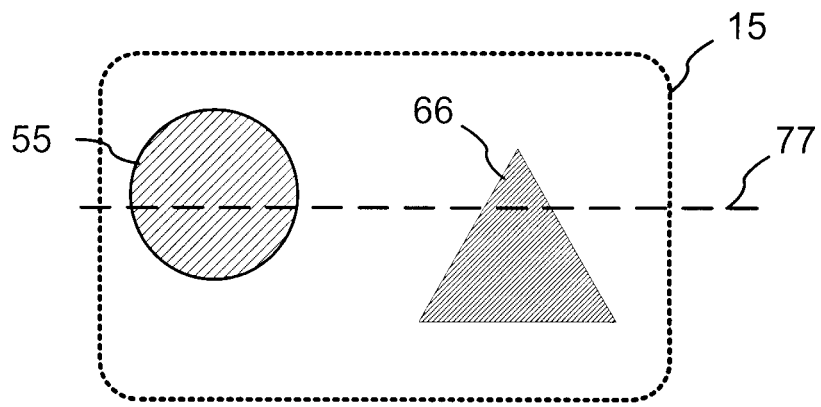
Figure 3C:
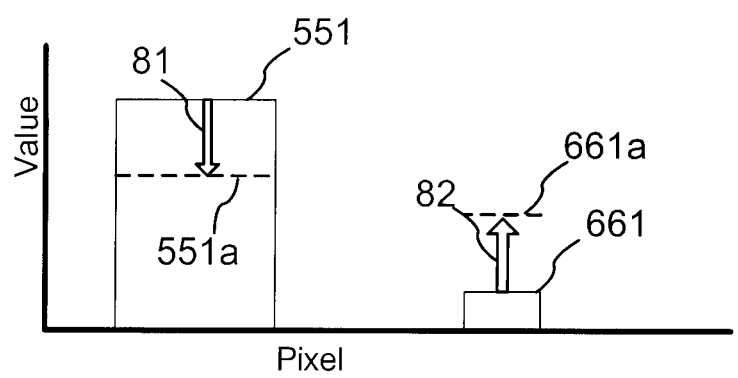
Figure 3D:
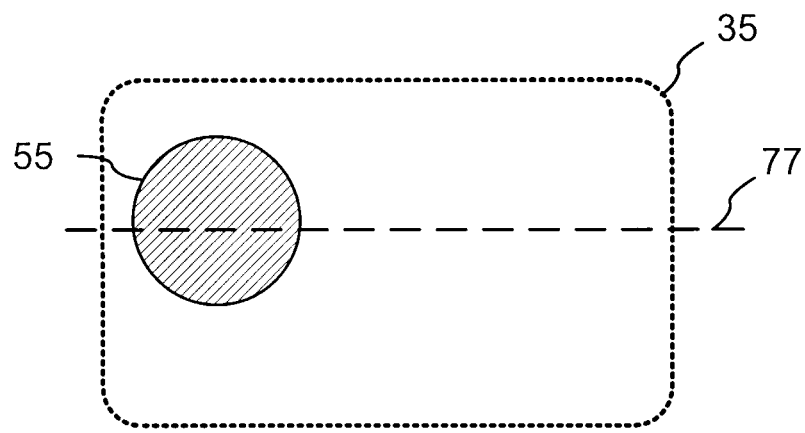
Figure 3E:
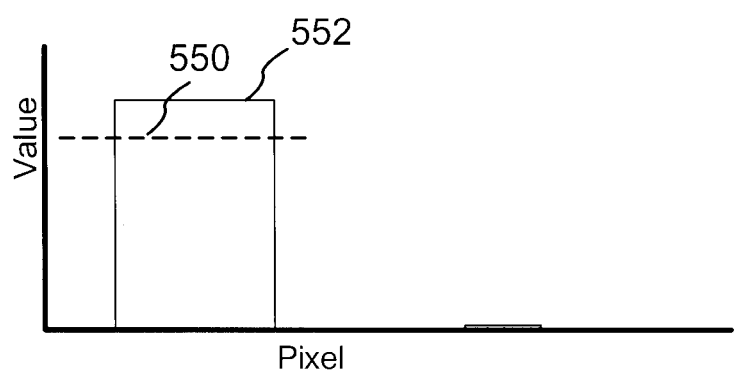
Figure 3F:
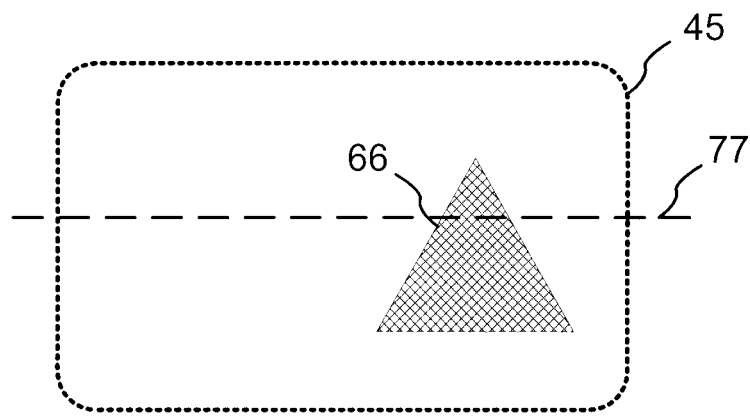
Figure 3G:
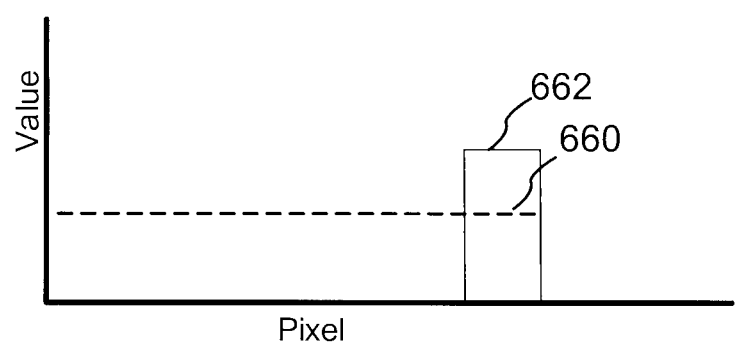

The aforedescribed steps of the method 3 for depth map generation are illustrated in FIGS. 3A-3G by way of example, starting with an exemplary MCI 5 shown in FIG. 3A. In this example, the MCI 5 includes a red disk-shaped region 55 and a green triangle-shaped region 66, with the red color represented by a slanted shading pattern and the green color represented by a cross-hatch shading pattern. Turning next to FIG. 3B, the Cr chroma component 15 obtained in step 10 is illustrated in the form of a grey-scale image, with the "red" and "green" regions 55, 66 represented by slanted patterns of different densities. Pixel values of the Cr component 15 for pixels located along a line 77 are represented in a plot shown in FIG. 3C, with a line 551 representing pixel values of the Cr component for first pixels in the red region 55, and a line 661 representing pixel values of the Cr component for second pixels in the green region 66. FIGS. 3D and 3F illustrate the R (red) and G (green) RGB components of the MCI 5, respectively, obtained in step 13 of the method 3. Lines 552 and 662 in FIGS. 3E and 3F illustrate the R and G values, respectively, for pixels located along the line 77 in the MCI 5, with the red and green thresholds RedThreshold(1), GreenThreshold(1) shown by dashed lines 550 and 660, respectively. Since both the R pixel values 552 in the region 55 and the G pixel values 662 in the region 66 exceed their respective thresholds 550 and 660, the "red" and "green" regions 55 and 66 in the Cr component image 15 are identified as regions requiring Cr values adjustments, which are performed in step 17 as indicated by arrows 81 and 82 in FIG. 3C. Resulting color-adjusted Cr values 551a and 661a are assigned as the depth values to respective first and second pixels along the line 77 in the depth map 25, with an optional scaling step 19 which may take place after all lines in the Cr component image 15 have been processed.

Turning now back to FIG. 2, steps 13, 17 and 19 transform the Cr component 15 of the MCI 5 into a depth map 25, by assigning pixel values of the scaled and color-adjusted Cr component as depth values to pixels of the MCI 5, or in other words using the scaled and color-adjusted Cr component of the MCI 5 as the depth map 25. In some embodiments, this depth map 25 may be directly used by the DIBR process 40 shown in FIG. 1 to produce the SIP 57.

In other embodiments, an additional smoothing step 27 may be advantageously performed to smoothen the depth map 25 using a spatial 2D filtering thereof to produce a smoothed map 25s, which may then be used by the DIBR process 40 to produce the SIP 57. By way of example, a 2D Gaussian filter can be applied to the depth map 25 in the step (27), as exemplified by lines (244), (245) of the MATLAB® code in Appendix using standard MATLAB® library routines. One goal of this step 27 is to ameliorate any potential quantization or contouring artifacts resulting from the thresholding and scaling. The degree of smoothing can be modified to suit the purpose of a particular application and/or image content. Other filtering, such as asymmetrical or conditional smoothing, can also be used in this step.

3D Image Generating Apparatus

Figure 4:
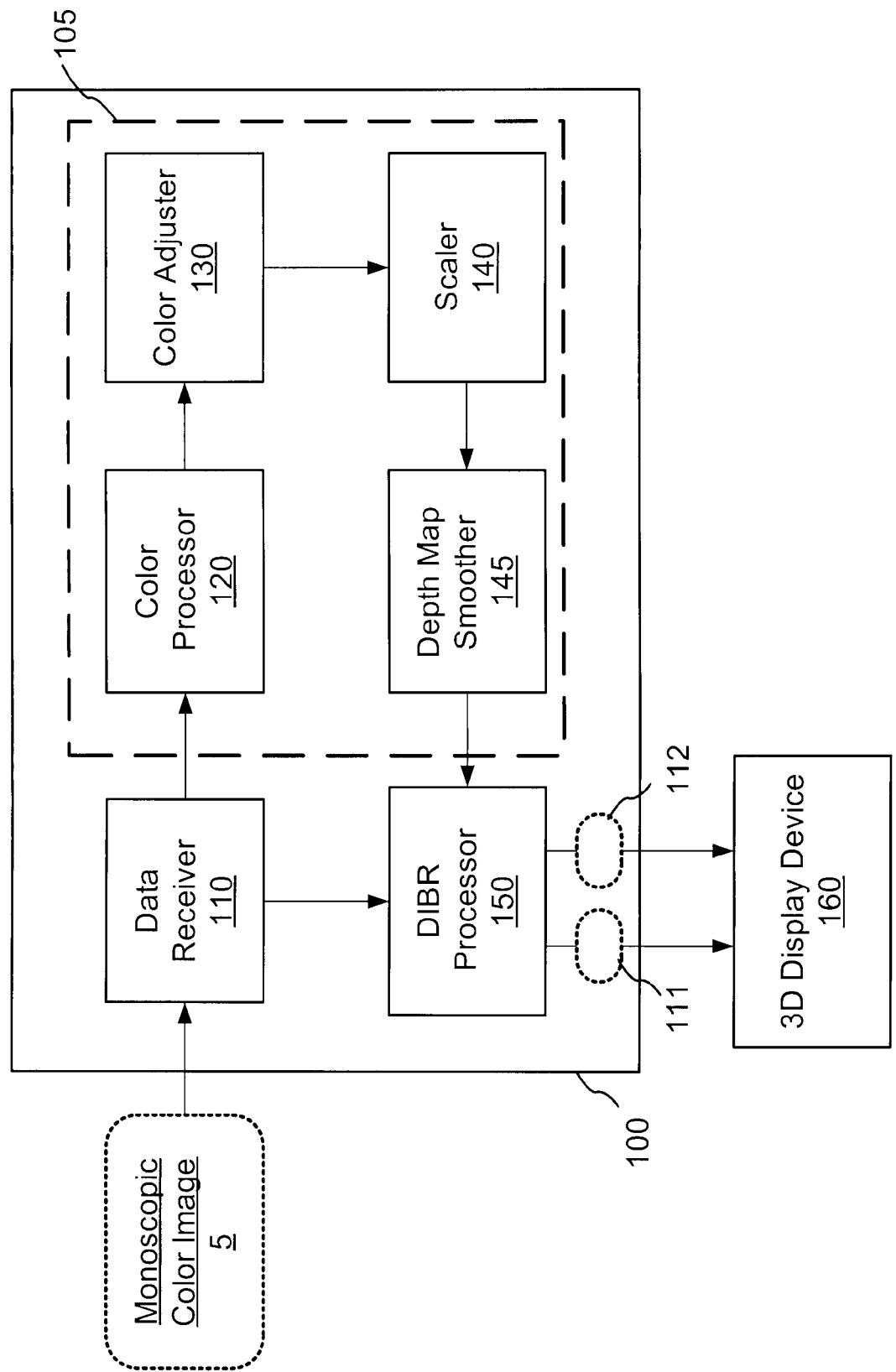
FIG. 4 is a block diagram of a 3D image generating apparatus.

Turning now to FIG. 4, another aspect of this invention provides an apparatus 100 for generating a stereoscopic view of the MCI 5 on a 3D display device 160. The source image MCI 5 is received from a transmission medium in the form of an encoded data signal, which is decoded by a video data receiver 110, for example as it is done in commercial digital TV tuners/receivers, and then fed to a depth map generator 105, which in the shown embodiment is formed by a chain of sequentially connected color processor 120, color adjuster 130, scaler 140, and depth map smoother 145. The depth map generator 105 generates the depth map 25s based on the first color component 15 of the MCI 5, and provides it to a DIBR processor 150. The original MCI 5 in a suitable data format is also fed to the DIBR processor 150. The DIBR processor 150 outputs at least one stereoscopic image pair 111, 112 generated using the depth map 25s, or a plurality of multi-view images, which is/are then fed to the 3D display device 160 for providing the stereoscopic view or views.

The color processor 120 may perform functions similar to those performed in steps 10 and 13 described hereinabove with reference to FIG. 2, namely it may obtain the first color component 15 of the MCI 5 from decoded image data received from the data receiver 110 and provide it to the color adjuster 130; it may also convert the MCI 5 into an image format suitable for generating the second color component, and extract said second color component in the form of pixel values C2($n,m$). If the first color component 15 is not readily available from image data provided by the data receiver 110, the color processor 120 may generate the first color component 15 from the received image data. The color adjuster 130 is operatively connected between the color processor 120 and the scaler 140 for selectively adjusting pixel values of the first color component 15 based on pixel values of the second color component for respective pixels, as described hereinabove with reference to step 17 and FIG. 2. In one embodiment wherein the first color component 15 is the Cr component of the MCI 5, the color processor 120 may receive the decoded image data representing the MCI 5 in a component Y'CbCr format from the data receiver 110, converts this image data into the RGB format, stores the MCI 5 in both of these formats, and feeds to the color adjuster 130 the Cr component of the MCI 5, and at least one of the RGB components of the MCI 5, for example the R and G components. The color adjuster 130 then forms a preliminary depth map for the MCI 5 on the basis of the Cr component of the MCI 5. This may be done by adjusting pixel values of the first color component, in this case the Cr pixel values, in regions of the MCI 5 that are selected based on pixel values of the second color component, for example based on the R and G values for respective pixels, as described hereinabove with reference to FIG. 2 and FIGS. 3A-3G. This process results in the color-adjusted Cr component that is then scaled by the scaler 140 that performs the scaling step 19 described hereinabove to produce the depth map 25. In other embodiments, the scaler 140 may operatively precede the color adjuster 130.

The depth map smoother 145 and the DIBR processor 150 respectively perform the smoothing step 27 and the DIBR process 40 shown in FIGS. 1 and 2 and described hereinabove.

The embodiment of FIG. 4 is suitable for various applications showing still or moving images, such as multi-view autostereoscopic displays, 3D videoconferencing, 3D television, and sequences of image frames for motion pictures.

In multi-view displays, multiple views and stereoscopic pairs are generated from a received 2D television images. Multi-view images are rendered images that give an impression that they were captured from camera positions different from the original camera position.

For sequences of images, the smoothing performed by the depth map smoother 145 helps minimize any perceived jerkiness that may otherwise arise between frames from the DIBR processor 150 when not being preceded by edge-smoothing. This is because such depth map smoothing results in a spreading of the depth (as contrasted to a sharp change in depth), such that the edges are not as precisely localized depth-wise.

The color processor 120, the color adjuster 130, the scaler 140, the depth map smoother 145, and the DIBR processor 150 may all be implemented using one processor. Normally, these functions are performed under control of a software program product. During execution, normally the software program product is loaded into a memory, like a RAM, and executed from there. The program may be loaded from a background memory, like a ROM, hard disk, or magnetic and/or optical storage, or may be loaded via a network like the Internet. Optionally an application specific integrated circuit may provide the disclosed functionality.

The encoded data signal received by the data receiver 110 may be a video signal such as a broadcast signal received via an antenna or cable but may also be a signal from a storage device like a VCR (Video Cassette Recorder) or Digital Versatile Disk (DVD), or a hard disk of a computer. The signal is provided at the input connector 510. The 3D image generating apparatus 100 might e.g. be a 3D TV. Alternatively it might be e.g. a set top box, a satellite-tuner, a VCR player, a DVD player or recorder. The 3D image generating apparatus 100 may optionally comprise storage means, like a hard-disk or means for storage on removable media, e.g. optical disks. The 3D image generating apparatus 100 might also be a system being applied by a film-studio or broadcaster.

An apparatus analogous to the apparatus 100 may also be used for generating 3D motion pictures from a sequence of monoscopic color images such as MCI 5; in this embodiment the data receiver 110 functions as an image receiver for receiving each monoscopic color image; the depth map generator 105 generates a depth map for each MCI based on a color component of the respective MCI, said color component provided by the image receiver; the DIBR processor 150 processes each monoscopic color image based on the corresponding depth map to render at least one deviated image, e.g. 112, to form at least one stereoscopic image pair 111, 112 for each of the received monoscopic color images, where color image 111 may be either the MCI 5 or a second deviated image corresponding to a view point that is different from either the view point of the MCI 5 or of the deviated image 112. The multi-view display 160 sequentially generates at least one stereoscopic view from each stereoscopic image pair 111, 112.

The invention described hereinabove provides method and apparatus for converting digital color images, either stills or video, from monoscopic 2D to stereoscopic 3D images. According to the invention, source color images are decomposed to their constituent chrominance and luminance components, and intensity levels of the chrominance components, either with or without information from the luminance component, are optionally adjusted to generate color-based depth maps. These depth maps are images containing intensity values, at each pixel or group-of-pixels location, which are correlated to the estimated depth of corresponding pixels in the source images. The depth maps are then processed using a depth-image-based rendering technique to create color images with new camera viewpoints for stereoscopic and/or multi-view displays. The method advantageously provides clean segregation of objects and/or parts of objects in the original 2D images.

The invention has been described hereinabove with reference to particular embodiments but is not limited thereto, and many other embodiments and variants of the method and apparatus described hereinabove may be envisioned by those skilled in the art. For example, although the concrete embodiments of the method described hereinabove utilize the Cr chroma component of the source color image as the first color component that is the basis from which the depth map is obtained, other embodiments may utilize the Cb component or a chroma component of another color system or combinations of chroma and/or luma components of the source color image as the first color component of the present invention. For example, in the CMYK color system used in printing, the cyan (C) component may be a suitable choice to use as the basis for the depth map, i.e. as the first color component, and pixel values of the red, green and/or yellow components of the source image can be used to identify regions wherein the first color component values may require local adjustments. A set of lookup tables or transformation matrix/matrices may be used to process the chrominance components, individually or as a weighted combination, either with or without additional information from other pictorial and/or motion depth cues to derive the color-based depth maps.

Moreover, in embodiments wherein the depth map is generated based on the Cr chroma component, local adjustments of the Cr values other than those described hereinabove and in Appendix may be beneficial to produce a better depth map. For example, Cr values adjustments based on R and G values but not the B (blue) values as described hereinabove were found to be adequate for most movies with human actors with prevailing hue corresponding to skin tone. However, motion pictures having main characters of bright primary colors such as blue may require an alternative selection of the second color component, for example the blue, to identify Cr component regions for adjustment of Cr values.

Furthermore, the particular local adjustments of the first color component in regions of the source image that are selected based on their color are only one example of possible adjustments that may be performed on the selected first color component 15 to produce the depth map. Other embodiments may utilize one or more depth cues such as blur, familiar size, interposition, brightness, shading and shadows, linear perspective, atmospheric haze, texture gradient, and motion information from consecutive image frames to selectively adjust pixel values of the first color component in portions of the source color image and produce a more accurate depth map resulting in a more pleasing 3D viewing experience. In some embodiments, the method 3 of the present invention may be used in combination with other methods of depth map generation to provide pixel depth values for a portion or portions of the source color image, with depth values for other portions of the image obtained using an alternative method or methods, such as based on one or more monoscopic depth cues or analysis of frame sequences. For example, the method 3 of the present invention can be used in conjunction with a method for generating sparse surrogate depth maps disclosed in U.S. Patent Application 2007/0024614, in which most of the depth information is concentrated at edges and object boundaries, with missing depth values within relatively large areas of the bounded regions, which may be filled with depth values obtained using the method 3 of the present invention.

Of course numerous other embodiments may be envisioned without departing from the spirit and scope of the invention as defined by the appended claims.

APPENDIX

(1)    function ExampleMakeComponentDepthMap(inputFile, outputFile, RedReduction,
        GreenAugmentation, Scaling, nFrames)
(2) %%%%%%%%%%%%%%%%%%%%%%%%%%%%%%%%%%%%%%%%%%%%%%%%%%
    %%%%%%%%%%%%%%%%%%%%%%%%%%%%%%%%%%%%%%
(3) % Purpose: Creates a synthetic depth map based on the Cr color component
(4) % Usage:
(5) % ExampleMakeComponentDepthMap(inputFile, outputFile, RedReduction,
(6) % GreenAugmentation, Scaling, nFrames);

```
(7) % e.g., ExampleMakeComponentDepthMap('test###.bmp', 'testDM.bmp', 0.3, 0.1,
(8) % [newUpper newLower], [startFrame endFrame]);
(9) %
(10) % Takes in an .rgb or .yuv single frame image; extracts the V (i.e., Cr) component
(11) % as working depth map; reduces the red intensities; augments the green;
(12) % scales intensities of the modified image; and saves the image in either
(13) % .bmp or .yuv format. Loops through for a sequence of frames.
(14) %
(15) % Because .bmp image files are separate files(not a sequence), each file
(16) % must end with a number representing which frame of a series of images
(17) % it represents,
(18) %   eg: 'puppy0001.bmp','puppy0002.bmp','puppy0003.bmp', etc.
(19) % Furthermore, for the inputFile parameter the number of digits has to be
(20) % represented with an equal number of "#",
(21) %   eg: 'puppy####.bmp' for image files puppy0001.bmp, puppy0002.bmp,
(22) %       etc.
(23) %       'ginger##.bmp' for image files ginger01.bmp, ginger02.bmp,
(24) %       etc.
(25) %
(26) % Adjusting pixel values of the first color component:
(27) % When using the V component (of a .yuv image file) as a depth map, the
(28) % high intensity colors of red and green lead to exaggerated and reduced
(29) % intensity values, respectively, in the synthetic depth map relative to a
(30) % desired/ideal depth map. Thus, this algorithm allows the option to reduce
(31) % the potential unwanted effects of both high intensity red and green.
(32) % While doing so, it takes care not to affect the original colors in the
(33) % "flesh tone" areas which tend to appear relatively "natural" in depth.
(34) %
(35) %   inputFile        - Full path and filename with extension of image.
(36) %                      Can be either .rgb or .yuv (i.e., Y'CbCr)
(37) %   RedReduction     - Percentage at which the red intensities will be
(38) %                      reduced, takes values in decimal format.
(39) %   GreenAugmentation - Percentage at which to augment the value of the
(40) %                      green areas of the component map.
(41) %                      Takes values in decimal format.
(42) %   Scaling          - Scaling is an array of 2 values, specifying
(43) %                      the new lower bound and the new upper bound.
(44) %                      All the depth values will then be linearly
(45) %                      remapped to the new interval specified.
(46) %   nFrames          - A vector where the first value is the start
(47) %                      frame and the second value is the last frame.
(48) %   outputFile       - Full path and filename with extension of output
(49) %                      component depthmap
(50) %
(51) % N.B. This function is to be accompanied by the standard MATLAB image
(52) % processing library routines. The yuv format of the input file expected
```

(53) % here is a 4:2:2 image format, here referred to as "crc" or "ops" with a
(54) % header as described in Attachment 1. In general, all the image
(55) % processing steps, e.g., color space conversion, shifting and scaling of
(56) % intensity values in the depth map, thresholding, and blurring are based
(57) % on standard image processing practices.
(58) %%%%%%%%%%%%%%%%%%%%%%%%%%%%%%%%%%%%%%%%%%%%%
%%%%%%%%%%%%%%%%%%%%%%%%%%%%%%%%%%
(59) % Specifiable Constants
(60) RedThreshold = [60 90];   %Used to identify regions or pixels with high intensity red colors.
(61) %First value is the threshold value for the
(62) %difference when green is subtracted from red,
(63) %and the second is the value that the
(64) %red must exceed. Default = [60 90].
(65) %E.g., of less sensitive setting = [75 130].
(66) GreenThreshold = [185 120]; %% Threshold values to identify the
(67) %green rehions or pixels.  The first number
(68) %is the value that the green plane must exceed,
(69) %and the second is the value that the red plane
(70) %cannot exceed to a pixel be identified as green for adjustments. Default = [185 120].
(71) RedThreshold(3) = 14;    %% Adjustement to avoid flesh tones in images
(72) %when searching out high intensity red colors.
(73) %It is the amount of overlap that the
(74) %green values are allowed to exceed the blue.
(75) %Since on average high intensity flesh tones
(76) %have higher green then blue. Default = 14.
(77) RadiusOfBlur = 3;  %% Radius of the kernel used to blur the final
(78) %depth map. Slight blur helps improve the
(79) %quality of the rendered results. Default = 3

(80) % Determine number of input parameters
(81) if (nargin ~= 6)
(82) error('Program requires 6 parameters. E.g.
ExampleMakeComponentDepthMap(test##.bmp, testDM.bmp, 0.4, 0, [50 200], [1 10]');
(83) end

(84) % Find length of inputFile string and file extension
(85) Length(1) = length(inputFile);
(86) fileExtension =inputFile(Length(1)-3:Length(1));

(87) % Check if yuv image format
(88) if (fileExtension == '.crc') % i.e., yuv
(89) inputType = '.yuv';
(90) fprintf('**Reading Header**');
(91) [yuv header headerNumeric] = readops(inputFile,1,1); %reading yuv file
(92) rgb = ops2rgb(yuv); % extract rgb values from yuv image format

```
(93) % Check if bmp image format
(94) elseif (fileExtension == '.bmp')
(95) inputType = '.bmp';
(96) % in contrast to .yuv as a single sequence of images files
(97) % .bmp files are separate files, one for each frame

(98) % Find out number of digits in frame number naming of bmp files
(99) % and tease out the rest in the filename
(100) [v1] = regexp(inputFile,'#'); %find character position(s) of '#'
(101) temp = size(v1);
(102) lengthHash = temp(2);
(103) startHash = min(v1); % start position
(104) endHash = max(v1); % end position
(105) if startHash ~= 1
(106) part1Name = inputFile(1:startHash-1);
(107) else
(108) part1Name = '';
(109) end
(110) part2Name = inputFile(endHash+1:Length(1));

(111) stemp = '';
(112) for i= 1:lengthHash-1;
(113) stemp = strcat(stemp,'0');
(114) end
(115) baseDigits = strcat(stemp,'0'); % for later use in loop
(116) digits = strcat(stemp,'1'); % for first frame (117) firstFrame = [part1Name, digits, part2Name];
(118) rgb = imread(firstFrame);
(119) yuv = rgb2ops(rgb); % determine yuv values from rgb image format
(120) else
(121) error('\n***Program only accepts .bmp or .yuv format***\n');
(122) end (123) % Find length of outputFile string
(124) Length(2) = length(outputFile);
(125) if outputFile(Length(2)-3:Length(2)) == '.crc'; % i.e. yuv
(126) outputType = '.yuv';
(127) elseif outputFile(Length(2)-3:Length(2)) == '.bmp';
(128) outputType = '.bmp';
(129) else
(130) error('** Output ** in .bmp or .yuv format? -- indicate as file extension');
(131) end
```

(132) % Check if correct scaling specification
(133) if (Scaling(1) > Scaling(2) || Scaling(1)< 0 || Scaling(2)> 255)
(134) error('Please check range: newLowerBound newUpperBound');
(135) end (136) % Check if correct frame specification
(137) if (nFrames(1) <= 0 || nFrames(1)> nFrames(2))
(138) error('Frame numbers incorrect');
(139) end
(140) fprintf('\n');

(141) % Major loop
(142) % Cycle through all image frames in inputFile
(143) Frames=0;
(144) for Frames = nFrames(1):nFrames(2);

(145) %%%%%%%%%%%%%%%%%%%%%%%%%%%%%%%%%%%%%%%%%%%%%%%%%%%%%%%%%%%%%%%%%%%%%%%%%%%%%%%%%%
(146) %%% ------ PROCESS A: Convert to working color spaces -------   %%%
(147) %%% (The code here will depend on the color space used in the inputFile %%%
(148) %%%        Can be coded to cover all major color spaces.)        %%%
(149) %%%        Here working with rgb and yuv (YCbCr) color spaces    %%%
(150) %%%%%%%%%%%%%%%%%%%%%%%%%%%%%%%%%%%%%%%%%%%%%%%%%%%%%%%%%%%%%%%%%%%%%%%%%%%%%%%%%%
(151) fprintf(sprintf('%s%s%s', '**Processing Frame ', int2str(Frames), '**\n'));
(152) if Frames ~= 1; %if equal to 1, the image is already loaded (153) if inputType == '.yuv';
(154) yuv = readops(inputFile,Frames,1); %read data from yuv image
(155) rgb = ops2rgb(yuv); %convert to rgb color space and data format (156) elseif inputType == '.bmp';
(157) %determine number of digits in frame number
(158) fDigits = int2str(Frames);
(159) array = size(fDigits);
(160) nDigits = array(2);

(161) %generate frame number in character format for filename
(162) digits = baseDigits(1:(lengthHash-nDigits));
(163) digits = strcat(digits, fDigits);

(164) %change filename based on frame number & read
(165) bmpFileName = [part1Name, digits, part2Name];
(166) rgb = imread(bmpFileName,'bmp');
(167) yuv = rgb2ops(rgb);

(168) end (169) end (170) %           Y           U           V
(171) % c: {[480x720 uint8] [480x360 uint8] [480x360 uint8]}
(172) choice = 3; % pick V component
(173) component = uint8(yuv.c{choice}); % takes the U or V component of a .yuv image
(174) % (2nd or 3rd component)
(175) %%%%%%%%%%%%%%%%%%%%%%%%%%%%%%%%%%%%%%%%%%%%%%%%%%%%%%%%%%%%%%%%%%%%%%%%%%%

(176) %%%%%%%%%%%%%%%%%%%%%%%%%%%%%%%%%%%%%%%%%%%%%%%%%%%%%%%%%%%%%%%%%%%%%%%%%%%
(177) %%% ----- PROCESS B: Adjust (modify) intensity values by linear scaling ----- %%%
(178) %%%                                                                      %%%
(179) %%%%%%%%%%%%%%%%%%%%%%%%%%%%%%%%%%%%%%%%%%%%%%%%%%%%%%%%%%%%%%%%%%%%%%%%%%%
(180) %assign new and old upper and lower bounds of range of intensity values
(181) oldMin = double(min(min(component)))
(182) oldMax = double(max(max(component)))
(183) newMin = double(Scaling(1))
(184) newMax = double(Scaling(2))

(185) %cast as double for precision in interpolation
(186) workingComponent = double(component);
(187) %check whether there is need for scaling
(188) if(strcmp(Scaling,'none') || ((oldMin == newMin) && (oldMax == newMax)))
(189) fprintf('Original range of intensities not changed/n');
(190) else
(191) workingComponent = ((workingComponent-oldMin)/(oldMax-oldMin))*(newMax-newMin) + newMin;
(192) end
(193) % force values to be between 0 and 255
(194) component = uint8(workingComponent);

(195) %%%%%%%%%%%%%%%%%%%%%%%%%%%%%%%%%%%%%%%%%%%%%%%%%%%%%%%%%%%%%%%%%%%%%%%
(196) %%%       PROCESS C: Adjust intensities as requested       %%%
(197) %%%    This section is customizable for         %%%
(198) %%%     different inputFile program content and applications. %%%
(199) %%%      Here the modification is based on thresholding.   %%%
(200) %%% However, it can be based on transformations using    %%%
(201) %%%    either look-up tables or transformation matrices    %%%
(202) %%%%%%%%%%%%%%%%%%%%%%%%%%%%%%%%%%%%%%%%%%%%%%%%%%%%%%%%%%%%%%%%%%%%%%%

```
%%%%%%%%%%%%%%%%%%%%%%%
(203) Min = min(min(component));
(204) for m = 1:length(component(:,1));
(205) for n = 1:length(component(1,:));

(206) % suppression of red intensities based on values of r, g, and b
(207) % N.B. rgb(m,n,1), rgb(m,n,2), & rgb(m,n,3) refers to
(208) %     the Red,    Green,   and   Blue planes, respectively
(209) if (rgb(m,n*2,1) - rgb(m,n*2,2) > RedThreshold(1) && rgb(m,n*2,1) > RedThreshold(2)
      && (rgb(m,n*2,3) > (rgb(m,n*2,2) - RedThreshold(3)) ));
(210) %reduction of red by a percentage of the difference between
(211) %the current depthmap value and the minimum depthmap value
(212) Difference = component(m,n) - Min;
(213) component(m,n) = component(m,n) - Difference*(RedReduction);

(214) % augmentation/enhancement of green intensities
(215) elseif (rgb(m,n*2,2) > GreenThreshold(1) && rgb(m,n*2,1) < GreenThreshold(2)) &&
      GreenAugmentation ~= 0;
(216) component(m,n) = component(m,n) + component(m,n) * GreenAugmentation;
(217) end (218) end
(219) end
(220) % force values to be between 0 and 255
(221) component = uint8(component);

(222) %%%%%%%%%%%%%%%%%%%%%%%%%%%%%%%%%%%%%%%%%%%%%%
      %%%%%%%%%%%%
(223) %%% Resize: Code here depends on color subsampling %%%
(224) %%%          used in type of inputFile        %%%
(225) %%% Here expects .yuv to be 4:2:2 format; thus,  %%%
(226) %%% code to double each column of the component  %%%
(227) %%%   when outputting synthetic depth map      %%%
(228) %%% i.e., resize from 480x360 to 480x720       %%%
(229) %%%%%%%%%%%%%%%%%%%%%%%%%%%%%%%%%%%%%%%%%%%%%%
      %%%%%%%%%%%%
(230) output = component(:,1);
(231) for n = 1:length(component(1,:));
(232) if n == 1; % since first column is already present in component, we only need to add it again
(233) output = cat(2, output, component(:,n));
(234) else  % the other columns are not present in component, so we need to add them twice
(235) output = cat(2, output, component(:,n), component(:,n));
(236) end
(237) end
(238) %%%%%%%%%%%%%%%%%%%%%%%%%%%%%%%%%%%%%%%%%%%%%%
```

```
%%%%%%%%%%%%%%%%%%%
(239) %%%   PROCESS D:   Gentle smoothing (Gaussian blurring)   %%%
(240) %%%      of image to reduce contouring effects and      %%%
(241) %%% visible effects of outliers in local neighbourhoods %%%
(242) %%%%%%%%%%%%%%%%%%%%%%%%%%%%%%%%%%%%%%%%%%%%%
      %%%%%%%%%%%%%%%%%%%
(243) % Calls MATLAB filter to blur whole image
(244) H = fspecial('disk',RadiusOfBlur);
(245) output = imfilter(output,H,'replicate');

(246) %%%%%%%%%%%%%%%%%%%%%%%%%%%%%%%%%%%%%%%%%%%%%
      %%%%%%%%%%%%%
(247) %%%          Prepare for output         %%%
(248) %%% Checks to see if we need to save depthmap to %%%
(249) %%%          a .bmp or .yuv file        %%%
(250) %%%%%%%%%%%%%%%%%%%%%%%%%%%%%%%%%%%%%%%%%%%%%
      %%%%%%%%%%%%%
(251) output = cat(3,output,output,output);  %working image was single plane
(252) %change to 3 planes
(253) if outputType == '.yuv';
(254) yuv = rgb2ops(output);  % convert to yuv
(255) appendOps(outputFile,yuv, 1);  % append frame to output sequence
(256) elseif outputType == '.bmp';
(257) imwrite(output,[outputFile(1:Length(2)-4) digits '.bmp'],'bmp');
(258) end % end of looping through frames in sequence (259) figure, imshow(output);
(260) end;
(261) return
(262) %%%%%%%%%%%%%%%%%%%%%%%%%%%%%%%%%%%%%%%%%%%%%
      %%%%%%%%%%%%%%%%%%%%%%%%%%

(263) %%%%%%%%%%%%%%%%%%%%%%%%%%%%%%%%%%%%%%%%%%%%%
      %%%%%%%%%%%%%%%%%%%%%%%%
(264) % Functions
(265) %%%%%%%%%%%%%%%%%%%%%%%%%%%%%%%%%%%%%%%%%%%%%
      %%%%%%%%%%%%%%%%%%%%%%%%

(266) %%%%%%%%%%%%%%%%%-----------------------
(267) function [M, h] = rgb2ops(T,varargin)
(268) %--------------------------------------
(269) % Convert rgb image to yuv (.ops) format
(270) %--------------------------------------
(271) %[M h] = rgb2ops(T,fileName)
(272) %T arrives as T(Y,X,3) RGB uint8 image
```

(273) %M returned as M.c{1} M.c{2} M.c{3}   YUV 422 image (274) A = rgb2ycbcr(T); % MATLAB image processing toolbox utility
(275) M.c{1} = A(:,:,1);
(276) M.c{2} = A(:,1:2:end,2);
(277) M.c{3} = A(:,1:2:end,3);

(278) YUVType = '422';
(279) seqLength = 1;
(280) h = BuildOpsHeader(seqLength,YUVType); % header for yuv image file (281) if nargin > 1
(282) fileName = char( varargin(1));
(283) fileName
(284) WriteOps(M,h,fileName);  % create yuv image file
(285) end (286) return (287) %%%%%%%%%%%%%%%%%%%-----------------------
(288) function hn = BuildOpsHeader(seqLength,YUVType)
(289) %--------------------------------------------------------
(290) %   Build an .ops header, providing info on image file
(291) %--------------------------------------------------------
(292) Y = 1; U = 2; V = 3;
(293) hn = OpsHeader;
(294) load magicOps; %magicOps is a user string identifying image format
(295) hn.magic = magicOps;
(296) hn.type(6:8) = 'YUV';
(297) hn.length = seqLength;
(298) hn.ncomponents = 3;
(299) hn.interlace = 2;
(300) rows(1:3) = 480;
(301) cols(1:3) = 720;
(302) if YUVType == '422'
(303) cols(U) = cols(U)/2;
(304) cols(V) = cols(V)/2;
(305) end (306) hn.fc(Y).name(8)='Y';
(307) hn.fc(Y).rows  = rows(Y);
(308) hn.fc(Y).cols = cols(Y);

(309) hn.fc(U).name(8)='U';
(310) hn.fc(U).rows = rows(U);

(311) hn.fc(U).cols = cols(U);

(312) hn.fc(V).name(8)='V';
(313) hn.fc(V).rows = rows(V);
(314) hn.fc(V).cols = cols(V);

(315) return (316) %%%%%%%%%%%%%%%%%------------------------
(317) function [image, h, hn] = readops(a,varargin)
(318) %reads .ops image sequence file (an in-house image format)
(319) %.ops files are yuv files with a 1028-byte header
(320) %[image(n).c{Y,U,V} header headerNumeric] = readops('file', <start frame> <number to read>);

(321) Y=1; U=2; V=3;
(322) %-------------------------------------------------------------------
(323) %       read image a
(324) %-------------------------------------------------------------------

(325) fp = fopen(a, 'r');
(326) if fp == -1
(327) image.c{Y} = [];
(328) image.c{U} = [];
(329) image.c{V} = [];
(330) h = OpsHeader;
(331) fprintf('Could not open %s\n',a);
(332) return
(333) end (334) header = uint8(fread(fp, 1024, 'uint8'));  %read Ops header
(335) header = header';
(336) header = char(header);
(337) [h hn] = parseOpsHeader(header);

(338) if (str2num(char(h.length)) == 0)
(339) image.c{Y} = [];
(340) image.c{U} = [];
(341) image.c{V} = [];
(342) return
(343) end (344) if (nargin > 1)  % if caller specifies the frame number to start reading
(345) startFrame = varargin{1} - 1;  %zero offset startFrame
(346) else
(347) startFrame = 0;  %default: start at first frame in file (348) end (349) if (nargin > 2)  % if caller specifies the number of frames to read
(350) nFrames = varargin{2};
(351) else
(352) nFrames = 1; %default: read 1 frame
(353) end (354) %fprintf('read: startFrame: %d, nFrames: %d\n',startFrame,nFrames);

(355) image.c{Y} = []; %the fields
(356) image.c{U} = [];
(357) image.c{V} = [];

(358) bytesPerFrame = 0;
(359) ic = str2num(h.ncomponents);

(360) for i = 1:1:ic %read size of components
(361) component(i).cols = str2num(h.fc(i).cols);
(362) component(i).rows = str2num(h.fc(i).rows);
(363) end (364) %position filePointer
(365) for i = 1:1:ic
(366) bytesPerFrame = bytesPerFrame + (component(i).cols * component(i).rows);
(367) end
(368) fseek(fp, (bytesPerFrame * startFrame), 'cof' );

(369) %allocate space for image(s)
(370) for i = 1:1:ic
(371) tmp{i} = uint8(zeros(component(i).rows, component(i).cols));
(372) end (373) for iFrame = 1:1:nFrames
(374) for i = 1:1:ic
(375) image(iFrame).c{i} = tmp{i};
(376) end
(377) end (378) for iFrame = 1:1:nFrames
(379) for i = 1:1:ic
(380) % Read raw B/W image of type uint8
(381) p = uint8(fread(fp, [component(i).cols  component(i).rows], 'uint8'));
(382) p = p'; % turn image 90 degrees
(383) image(iFrame).c{i} = p;
(384) end (385) end (386) fclose(fp);
(387) return (388) %%%%%%%%%%%%%%%%%-----------------------
(389) function statusAppend = appendOps(fileName,opsData,nFramesToAppend)
(390) %statusAppend = appendOps(fileName,opsData, nFramesToAppend)
(391) %append opsData to yuv (i.e., ops) file
(392) %update header (393) %read header of fileName in append mode (394) %----------------------------------------------------------------------
(395) % Open file for appending
(396) %----------------------------------------------------------------------
(397) if ~exist(fileName) %does the file exist? If no then create the file from scratch
(398) %fprintf('Could not find %s \n',fileName);
(399) YUVType = '422';
(400) seqLength = 1;
(401) h = BuildOpsHeader(nFramesToAppend,YUVType);

(402) %fileName = char( varargin(1));
(403) WriteOps(opsData,h,fileName,1,nFramesToAppend);

(404) fprintf('Creating a new file %s \n',fileName);
(405) statusAppend = 1;
(406) return
(407) end (408) fp = fopen(fileName, 'r+'); %Can the file be opened
(409) if fp == -1
(410) statusAppend = 0; % error return
(411) fprintf('Could not open %s\n',fileName);
(412) return
(413) end (414) %----------------------------------------------------------------------
(415) % read header information
(416) %----------------------------------------------------------------------
(417) header = uint8(fread(fp, 1024, 'uint8')); %read Ops header - get frame count
(418) header = header';
(419) header = char(header);
(420) [h hn] = parseOpsHeader(header);

(421) %----------------------------------------------------------------------

```
(422) %  append new image data
(423) %--------------------------------------------------------------------
(424) %file pointer for writing is already at the end of file because
(425) %we opened with a+ mode
(426) %do a binary write of ops data
(427) fseek(fp,0,'eof');
(428) ic = str2num(char(h.ncomponents));
(429) for iFrame = 1:1:nFramesToAppend
(430) for i = 1:1:ic   %Y,U,V
(431) %fprintf('frame: %d, ic: %d count: %d filePointer: %d\n', iFrame,i, count,ftell(fp));
(432) p = opsData(iFrame).c{i};
(433) p = p';  % turn image 90 degrees
(434) count = fwrite(fp,p,'uint8');
(435) end
(436) end (437) %--------------------------------------------------------------------
(438) %  update frame counter in header of ops file
(439) %--------------------------------------------------------------------
(440) hn.length = hn.length + nFramesToAppend;
(441) seqLength = uint8(num2str(hn.length));   %ASCII conversion
(442) h.length(end - length(seqLength)+1:1:end) = seqLength;

(443) %position file pointer to ops frame count in header
(444) %write new frame count
(445) %fclose(fp);
(446) %fp = fopen(fileName,'a+');
(447) locOfLength = 12;
(448) frewind(fp);
(449) fseek(fp, (locOfLength), 'bof' );
(450) %t = sprintf('%s',h.length);
(451) count = fwrite(fp,h.length,'uint8');
(452) if count ~= 8
(453) fprintf('Error writing seq length to header (%s)\n',fileName);
(454) return
(455) end (456) %close file
(457) fclose(fp);

(458) statusAppend = 1;
(459) return (460) %%%%%%%%%%%%%%%%%%--------------------------
(461) function [h, header] = writeOps(image,h,a,varargin)
(462) %image(iFrame).c{i}
```

(463) %h OpsHeader ASCII or numeric
(464) %a 'fileName'
(465) %<startFrame, nFrames>
(466) %writes .Ops sequence (467) %------------------------------------------------------------------------
(468) %        write image a
(469) %------------------------------------------------------------------------
(470) %fprintf('this one\n');
(471) fp = fopen(a, 'w');
(472) if(fp == -1)
(473) fprintf('Could not open file %s for writing.\n',a);
(474) return
(475) end (476) startFrame = 1; %default
(477) nFrames = 1;    %default (478) if (nargin > 3) % caller specifies frame number to start writing
(479) startFrame = varargin{1};
(480) if (isempty(startFrame)) startFrame = 1; end
(481) if (nargin > 4) % caller specifies number of frames to write
(482) nFrames = varargin{2};
(483) if (isempty(nFrames)) nFrames = 1; end
(484) end
(485) end (486) seqLength = uint8(num2str(nFrames)); %ASCII conversion
(487) h.length(1:8) = 32; %clear h.lengh to spaces (i.e. ASCII 32)
(488) h.length(end - length(seqLength)+1:1:end) = seqLength;

(489) if (isnumeric(h.ncomponents))
(490) t = uint8(num2str(h.ncomponents)); %ASCII conversion
(491) h.ncomponents(1:8) = 32; %clear h.lengh to spaces (i.e. ASCII 32)
(492) h.ncomponents(end - length(t)+1:1:end) = t;
(493) end (494) if (isnumeric(h.interlace))
(495) t = uint8(num2str(h.interlace)); %ASCII conversion
(496) h.interlace(1:8) = 32; %clear h.lengh to spaces (i.e. ASCII 32)
(497) h.interlace(end - length(t)+1:1:end) = t;
(498) end (499) for i = 1:1:str2num(char(h.ncomponents))
(500) if (isnumeric(h.fc(i).rows))
(501) t = uint8(num2str(h.fc(i).rows)); %ASCII conversion

```
(502) h.fc(i).rows(1:8) = 32;  %clear h.lengh to spaces (i.e. ASCII 32)
(503) h.fc(i).rows(end - length(t)+1:1:end) = t;
(504) end
(505) if (isnumeric(h.fc(i).cols))
(506) t = uint8(num2str(h.fc(i).cols));  %ASCII conversion
(507) h.fc(i).cols(1:8) = 32;  %clear h.lengh to spaces (i.e. ASCII 32)
(508) h.fc(i).cols(end - length(t)+1:1:end) = t;
(509) end
(510) end (511) [count header] = writeOpsHeader(fp,h);
(512) %count
(513) %header (514) ic = str2num(char(h.ncomponents));
(515) %fprintf('write:startFrame: %d, nFrames: %d\n',startFrame,nFrames);

(516) for iFrame = startFrame:1:(startFrame+nFrames-1)
(517) for i = 1:1:ic
(518) %fprintf('frame: %d, ic: %d count: %d filePointer: %d\n', iFrame,i, count,ftell(fp));
(519) p = image(iFrame).c{i};
(520) p = p';  % turn image 90 degrees
(521) count = fwrite(fp,p,'uint8');
(522) end
(523) end (524) fclose(fp);
(525) return (526) %%%%%%%%%%%%%%%%%%%----------------------
(527) function [h, hn] = parseOpsHeader(header)
(528) % Examines and extracts information from header
(529) % in yuv (that is, ops) image file (530) h  = OpsHeader;  %returns an empty Ops header
(531) hn = OpsHeader;
(532) load magicOps;
(533) fi = [4 8 8 8 8 1];  %field lengths of first 6 fields in header
(534) hNames = fieldnames(h);  %names of fields in header (535) fs = 1;    %current pointer into header
(536) for i=1:1:length(fi)
(537) h  = setfield(h, hNames{i},header(fs:fs+fi(i)-1));
(538) if ~isempty(str2num(getfield(h,hNames{i})))
(539) hn = setfield(hn,hNames{i},str2num(getfield(h,hNames{i})));
(540) else
```

(541) hn = setfield(hn,hNames{i},getfield(h,hNames{i}));
(542) end
(543) fs = fs + fi(i);
(544) end (545) if (h.magic ~= magicOps)
(546) %fprintf('Probably not an Ops sequence file\n');
(547) clear h;
(548) h = OpsHeader;
(549) zero = uint8(num2str(0));
(550) h.length(8) = zero;
(551) hn.length = 0;
(552) return
(553) end
(554) %read h.components (typically YUV)

(555) fi = [8 8 8 1]; %field sizes in fc - components
(556) fcNames = fieldnames(h.fc);
(557) for j=1:1:str2num(h.ncomponents)
(558) for(i=1:1:length(fcNames))
(559) h.fc(j) = setfield(h.fc(j),fcNames{i},header(fs:fs+fi(i)-1));
(560) if ~isempty(str2num(getfield(h.fc(j),fcNames{i})))
(561) hn.fc(j) = setfield(hn.fc(j),fcNames{i},str2num(getfield(h.fc(j),fcNames{i})));
(562) else
(563) hn.fc(j) = setfield(hn.fc(j),fcNames{i},getfield(h.fc(j),fcNames{i}));
(564) end
(565) fs = fs + fi(i);
(566) end
(567) end (568) fi = [8 217 512];
(569) offset = 7; %continue with 8th field in h
(570) for i=1:1:length(fi)
(571) h = setfield(h,hNames{offset+i},header(fs:fs+fi(i)-1));
(572) if ~isempty(str2num(getfield(h,hNames{offset+i})))
(573) hn = setfield(hn,hNames{offset+i},str2num(getfield(h,hNames{offset+i})));
(574) else
(575) hn = setfield(hn,hNames{offset+i},getfield(h,hNames{offset+i}));
(576) end
(577) fs = fs + fi(i);
(578) end (579) return (580) %%%%%%%%%%%%%%%%%-----------------------
(581) function RGB = ops2rgb(opsFrame)

(582) %example:
(583) %a = imread('BSnip.L.Ops, 4,1'); %read frame 4
(584) %rgb = ops2rgb(a);
(585) %imcascade(a,'rgb');
(586) %converts opsFrame.c{Y}, opsFrame.c{U}, opsFrame.c{V} to RGB(:,:,[R,G,B]);

(587) Y=1; U=2; V=3;

(588) YUV(:,:,Y) = opsFrame.c{Y};
(589) if( ~isempty(opsFrame.c{U}) & ~isempty(opsFrame.c{V}) )
(590) YUV(:,:,U) = hInterpolate(opsFrame.c{U}); BusyDot;
(591) YUV(:,:,V) = hInterpolate(opsFrame.c{V}); BusyDot;
(592) RGB = ycbcr2rgb(YUV); BusyDot;
(593) else
(594) fprintf('U and V are empty, filling with 128\n')
(595) YUV(:,:,U) = uint8(repmat(128,size(YUV(:,:,1))));
(596) YUV(:,:,V) = uint8(YUV(:,:,U));
(597) RGB = ycbcr2rgb(YUV); BusyDot;
(598) end
(599) return (600) %%%%%%%%%%%%%%%%%%------------------------
(601) function outImage = hInterpolate(srcImage,varargin)
(602) %interpolate by 2 Horizontally
(603) %outImage = hInterpolate(srcImage,c)
(604) %srcImage 2D array
(605) %<c filter coefficients> optional argument (606) if (nargin == 1)
(607) filterName = {'shift0.flt'}; %filterName is a cell array
(608) tmp = readFilter(filterName); %read filter coefficients
(609) c = tmp{1};
(610) else
(611) c = varargin{1};
(612) end (613) srcImage = srcImage'; %rotate image (614) outImage = srexpand(srcImage,2); %zero insertion (615) outImage = outImage'; %rotate back
(616) %imCascade(outImage,'Horizontally expanded'); %display image (617) c = c*2; %gain = 2 for interpolation (618) outImage = HFilter(outImage,c,1);

```
(619) %%Summary of contents of shift0.flt:
(620) % Filter length  = 25
(621) % Filter type    = Lowpass/highpass/bandpass Filter
(622) % Number of bands = 2
(623) % Band edge      = 0.000000 0.200000 0.300000 0.500000
(624) % Fx's           = 1.000000 0.000000
(625) % Wtx's          = 1.000000 1.000000
(626) %
(627) %-3.542906e-06
(628) %-7.210506e-03
(629) %4.633806e-06
(630) %1.360994e-02
(631) %-6.907395e-06
(632) %-2.629043e-02
(633) %9.171629e-06
(634) %4.860055e-02
(635) %-7.810741e-06
(636) %-9.647113e-02
(637) %9.930488e-06
(638) %3.149945e-01
(639) %4.999891e-01
(640) %3.149945e-01
(641) %9.930488e-06
(642) %-9.647113e-02
(643) %-7.810741e-06
(644) %4.860055e-02
(645) %9.171629e-06
(646) %-2.629043e-02
(647) %-6.907395e-06
(648) %1.360994e-02
(649) %4.633806e-06
(650) %-7.210506e-03
(651) %-3.542906e-06
(652) %
(653) return (654) %%%%%%%%%%%%%%%%%----------------------
(655) function coeff = readFilter(filterName)
(656) %filterName is a cell array (657) for i = 1:length(filterName)
(658) coeff{i} = load (filterName{i});
(659) gain = sum(coeff{i});
(660) if(gain > 0)
(661) coeff{i} = coeff{i}/(gain);
```

(662) %fprintf('gain: %d\n',gain);
(663) end
(664) end (665) return (666) %%%%%%%%%%%%%%%%%%%%-----------------------
(667) function image = HFilter(image,c,ss)
(668) %image the image
(669) %c - filter coefficients
(670) %ss - subsample by ss
(671) s = double(int16(length(c) /2 ));   %how much to pad with (= filter shift)
(672) t = HPad(image,s);  %return horizontally padded image in t
(673) t = filter(c,1,t,[],2);  %the 2 at the end signifies horizontal filtering
(674) t = UnHPad(t,2*s);  %remove padding 2*s  s for padding and s for filter shift
(675) %%-----------------------------------------------------------------
(676) %              subsample horizontally by ss
(677) %-----------------------------------------------------------------
(678) if (ss ==1)
(679) image = t;
(680) else
(681) image = t(:,1:ss:end,1);   %subsample horizontally by ss
(682) end (683) return

We claim:

1. A method of generating a depth map from a monoscopic color image (MCI) composed of pixels, the method comprising:
    a) obtaining a first color component of the MCI, said first color component corresponding to partial color information for pixels of the MCI;
    b) generating depth values from pixel values of only the first color component at corresponding pixels; and,
    c) generating the depth map from the depth values.

2. A method according to claim 1, wherein step b) comprises using scaled pixel values of the first color component as depth values at corresponding pixels.

3. A method according to claim 2, wherein the first color component is the Cr chroma component of the MCI in the Y'CbCr color system.

4. A method according to claim 2, wherein the first color component is one of chroma components of the MCI in the Y'CbCr color system or one of chroma components of the MCI in the CMYK color system.

5. A method according to claim 1, wherein step (b) comprises
    selectively adjusting pixel values of the first color component in a portion of the MCI for obtaining the depth values therefrom.

6. A method according to claim 5, wherein the portion of the MCI is selected by applying a pre-determined threshold criterion to pixel values of a second color component of the MCI.

7. A method according to claim 6, wherein the first color component is the Cr chroma component of the MCI in the Y'CbCr color system, and the second color component is one of red (R) and green (G) color components of the MCI in the RGB color system.

8. A method according to claim 7, wherein the portion of the MCI comprises one of: first pixels having R values satisfying a pre-determined red threshold criterion, and second pixels having G values satisfying a pre-determined green threshold criterion.

9. A method according to claim 8, wherein the pre-determined red threshold criterion comprises at least one of:
    determining if the red intensity values exceed a threshold value,
    determining if the red intensity values minus green intensity values exceed a threshold value, and
    determining if the blue intensity values minus green intensity values exceed a threshold value,
    and wherein the pre-determined green threshold criterion comprises determining if the green intensity values exceed a threshold value.

10. A method according to claim 8, wherein step (b) comprises one of: selectively reducing values of the first color component for the first pixels, and selectively enhancing values of the first color component for the second pixels.

11. A method according to claim 1, wherein step c) comprises smoothing the depth values to generate the depth map.

12. A method according to claim 11, wherein the step of smoothing the depth map comprises applying a 2D Gaussian filter thereto.

13. A method of generating a multi-view image comprising
    a. receiving a monoscopic color image (MCI) composed of pixels;
    b. generating a depth map from the MCI based on a first color component thereof, said first color component corresponding to partial color information for pixels of the MCI;
    c. utilizing a depth image based rendering (DIBR) algorithm to create at least one deviated image by processing the MCI based on the depth map, so as to form a stereoscopic image pair;
    wherein step b) includes determining depth values for pixels of the MCI from pixel values of only the first color component for corresponding pixels in at least a portion of the MCI.

14. A 3D image generating apparatus comprising:
    a data receiver for receiving data representing a monoscopic color image (MCI) composed of pixels;
    a depth map generator for generating a depth map comprising pixel depth values obtained from pixel values of only a first color component of the MCI, said first color component corresponding to partial color information for pixels of the MCI; and,
    a DIBR processor for processing the MCI based on the depth map to render at least one deviated image for forming at least one stereoscopic image pair.

15. A 3D image generating apparatus according to claim 14, further comprising a multi-view display for generating at least one stereoscopic view from the at least one stereoscopic image pair.

16. An apparatus for generating 3D motion pictures from a sequence of monoscopic color images, comprising a 3D image generating apparatus according to claim 15 for generating and sequentially displaying at least one stereoscopic view from each monoscopic color image from the sequence of the monoscopic color images.

17. A 3D image generating apparatus according to claim 14, wherein:
    the depth map generator comprises a scaling unit for scaling pixel values of the first color component for producing the pixel depth values.

18. A 3D image generating apparatus according to claim 17, wherein the depth map generator further comprises:
    a color processor for obtaining a second color component from the MCI;
    a color adjuster for selectively adjusting pixel values of the first color component based on pixel values of the second color component for respective pixels.

19. A 3D image generating apparatus according to claim 17, wherein the color processor is for obtaining the first color component from the MCI.

* * * * *